US012692997B1

(12) United States Patent
Li et al.

(10) Patent No.: US 12,692,997 B1
(45) Date of Patent: Jul. 28, 2026

(54) AMBIENT LAMP

(71) Applicants: ZHONGSHAN JIAEN OPTOELECTRONICS CO., LTD., Zhongshan (CN); ZHONGSHAN YONGQI ELECTRONIC TECHNOLOGY CO., LTD., Zhongshan (CN)

(72) Inventors: Bo Li, Zhongshan (CN); Shaoqi Ji, Zhongshan (CN)

(73) Assignees: ZHONGSHAN JIAEN OPTOELECTRONICS CO., LTD., Zhongshan (CN); ZHONGSHAN YONGQI ELECTRONIC TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 19/454,873

(22) Filed: Jan. 21, 2026

(30) Foreign Application Priority Data

Dec. 30, 2025 (CN) ......................... 202522825705.3

(51) Int. Cl.

| | |
|---|---|
| ***F21V 1/10*** | (2006.01) |
| ***F21S 6/00*** | (2006.01) |
| ***F21V 11/18*** | (2006.01) |
| ***F21V 14/08*** | (2006.01) |
| ***F21V 15/01*** | (2006.01) |
| ***F21V 21/005*** | (2006.01) |
| ***F21V 21/116*** | (2006.01) |
| ***F21V 21/30*** | (2006.01) |
| ***F21V 23/00*** | (2015.01) |
| ***F21V 23/06*** | (2006.01) |
| ***F21Y 113/20*** | (2016.01) |
| ***F21Y 115/10*** | (2016.01) |

(52) U.S. Cl.

CPC ................ *F21V 1/10* (2013.01); *F21S 6/008* (2013.01); *F21V 11/18* (2013.01); *F21V 14/08* (2013.01); *F21V 15/01* (2013.01); *F21V 21/005* (2013.01); *F21V 21/116* (2013.01); *F21V 21/30* (2013.01); *F21V 23/005* (2013.01); *F21V 23/06* (2013.01); *F21Y 2113/20* (2016.08); *F21Y 2115/10* (2016.08)

(58) Field of Classification Search

CPC ........... F21S 6/008; F21S 6/002; F21V 14/08; F21V 1/10; F21V 23/06

See application file for complete search history.

(56) References Cited

U.S. PATENT DOCUMENTS

| | | | | |
|---|---|---|---|---|
| 9,388,946 | B1 * | 7/2016 | Stagni | F21V 1/00 |
| 9,416,922 | B1 * | 8/2016 | Stagni | F21S 6/008 |
| 11,859,794 | B1 * | 1/2024 | Lin | F21V 23/003 |
| 2007/0230174 | A1 * | 10/2007 | Hicks | F21S 13/14 362/249.16 |
| 2016/0369959 | A1 * | 12/2016 | Ngai | F21V 7/0058 |
| 2023/0066487 | A1 * | 3/2023 | Yang | F21S 10/00 |

* cited by examiner

*Primary Examiner* — William N Harris

(74) *Attorney, Agent, or Firm* — HOWARD M COHN and Associates, LLC

(57) ABSTRACT

An ambient lamp includes a column lamp and a projection lamp. The column lamp includes a support column and a first light-emitting assembly arranged on the support column and extending along a length direction of the support column. The projection lamp is supported on the column lamp, is electrically connected to the column lamp and is configured to project dynamic projection light.

17 Claims, 22 Drawing Sheets

B

AMBIENT LAMP

CROSS-REFERENCE TO RELATED APPLICATIONS

This application claims priority of Chinese patent application No. CN 202522825705.3, filed on Dec. 30, 2025, the entire contents of which are incorporated herein by reference.

TECHNICAL FIELD

The present disclosure relates to indoor lighting, and in particular, to an ambient lamp.

BACKGROUND

With upgrading of modern home concepts, indoor lighting has shifted from traditional "functional lighting" to "ambience-oriented experiences". Consumers are no longer satisfied with lighting that merely provides basic brightness, but further seek additional value in terms of spatial decoration, mood regulation, and scene adaptation. As a result, ambient lamping has become one of the core products in fields of home decoration and intelligent lighting. However, most ambient lamps only support monochromatic static illumination, and their configurations are predominantly tabletop placements similar to desk lamps or wall-mounted types requiring additional fixation. These configurations occupy tabletop space, lack stable support structures, and are prone to tipping over or shifting, thus limiting their applicability to a narrow range of scenarios.

SUMMARY

In order to solve shortcomings in existing technologies (most existing ambient lamps only support monochromatic static illumination, some existing ambient lamps allow color switching but lack dynamic light and shadow layers, and their illumination is mostly unidirectional, resulting in a lack of natural, layered dynamic effects and poor user experience), the present disclosure is to provide an ambient lamp to solve above technological problems.

A first embodiment of the present disclosure provides an ambient lamp including a column lamp and a projection lamp. The column lamp includes a support column and a first light-emitting assembly arranged on the support column and extending along a length direction of the support column. The projection lamp is supported on the column lamp, is electrically connected to the column lamp and is configured to project dynamic projection light.

The beneficial effects of the present disclosure are as follow: the present disclosure provides an ambient lamp. The support column of the column lamp serves not only as a mounting carrier for the projection lamp but also as an installation base for the first light-emitting assembly, eliminating the need for additional support or fixation structures. This design addresses issues such as limited placement options and insufficient stability in desktop ambient lights. The column lamp is simple in shape, it can adapt naturally into various home decor settings, enhancing product integration with the space. Moreover, the combination of the column lamp and the projection lamp creates a composite lighting effect that can function either as an independent light source or a dynamic ambient lamp. This enriches the layers of atmospheric lighting, allowing users to select lighting effects according to different environments and ultimately enhancing the overall user experience.

Figure 1:
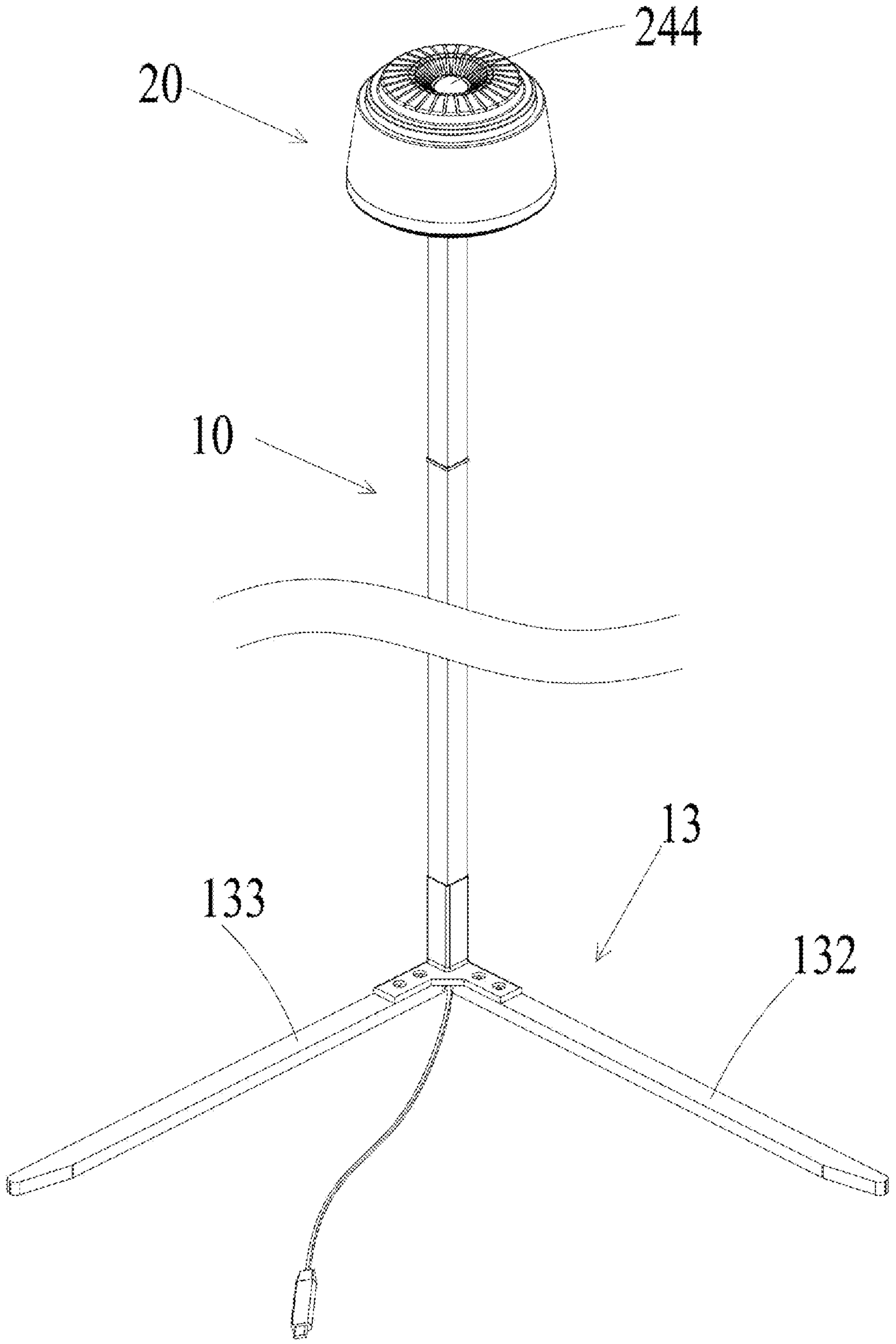
FIG. 1 is a schematic diagram of an ambient lamp according to a first embodiment of the present disclosure.

column lamp 10; second electrical terminal 10*a*; support column 11; connection housing 11*a*; hollow column section; first mounting channel 1111; light-transmitting surface 1101; opaque surface 1102; limiting plate; gap 1113; housing 1114; plug-in lampshade 1115; opening 1116; connection joint; limiting ring 1131; clamping groove 114; enclosing plate 115; corner portion 1151; second mounting channel 116; groove 1160; first groove 1161; second groove 1162; plug-in protrusion 1165; first plug-in protrusion 1163; second plug-in protrusion 1164; plug-in hole 117; plug-in post 118; power cord; first light-emitting assembly 12; light panel 121; second electrical connector 1211; third electrical connector 1212; third LED bead 122; fixed light board 123; fourth LED beads 124; support base 13; fourth mounting groove 131; first bracket 132; connection angle 1321; second bracket 133; mounting seat 134; movable brackets 135; power interface 14; power switch 15; third circuit board 16; projection lamp 20; first electrical terminal 20*a*; third light-emitting assembly 21; first LED beads 211; fourth light-emitting assembly 22; second LED beads 221; second light-emitting assembly 23; projection light 231; light-emitting element 2311; light-converging lens 2312; housing 2313; drive module 232; fixing lugs 2321; second mounting hole 2322; light-transmitting sheet 233; second control circuit board 234; third mounting holes 2341; receiving groove 235; fastener 236; lampshade assembly 24; light-shielding cover 241; light-transmitting cover 242; protective shell 243; lens 244; light-transmitting plate 245; bearing base 25; first mounting groove 2501; inner side wall 25010; central annular wall 25011; central bottom wall 25012; top wall 25013; annular rim; second mounting groove 2502; first light-transmitting holes 2503; second light-transmitting holes 2504; support column 251; first mounting hole 2511; annular third mounting groove 25022; first control circuit board 26; mounting piece 27; annular groove 271; plug hole 201; first electrical connector 202; projection light source 28.

DETAILED DESCRIPTION OF THE EMBODIMENTS

To make objectives, technical solutions, and advantages of the present disclosure clearer, the present disclosure will be further described in detail below with reference to accompanying drawings and specific embodiments. It should be understood that specific embodiments described herein are merely illustrative of the present disclosure and are not intended to limit the present disclosure.

Please referring to FIGS. 1-22, an ambient lamp provided by the present disclosure includes a column lamp 10 and a projection lamp 20 supported on the column lamp 10. The projection lamp 20 can emit ambient lamp. The projection lamp 20 and the column lamp 10 may be separable or fixed together. However, it is preferable that the projection lamp 20 and the column lamp 10 are separable, which facilitates users to replace the column lamp 10 or different styles of projection lamps 20. As shown in FIG. 8, the column lamp 10 includes a support column 11 and a first light-emitting assembly 12. The first light-emitting assembly 12 is arranged on the support column 11 and extends along an axial direction of the support column 11. The first light-emitting assembly 12 is electrically connected to the projection lamp 20.

In the above configuration, the support column 11 of the column lamp 10 not only serves as a mounting carrier for the projection lamp 20 but also serves as a mounting carrier for the first light-emitting assembly 12, eliminating the need for additional support or fixing structures. It solves problems of limited placement and insufficient stability for desktop ambient lamps. Moreover, the simple column design allows it to naturally integrate into various home scenarios, enhancing product's compatibility with space. Furthermore, the combination of the column lamp 10 and the projection lamp 20 creates a composite lighting effect that can function either as an independent illumination device or as a dynamic ambient lamp, enriching the atmosphere and providing users with lighting effects to choose from according to different environments, thereby improving the user experience.

Figure 3:
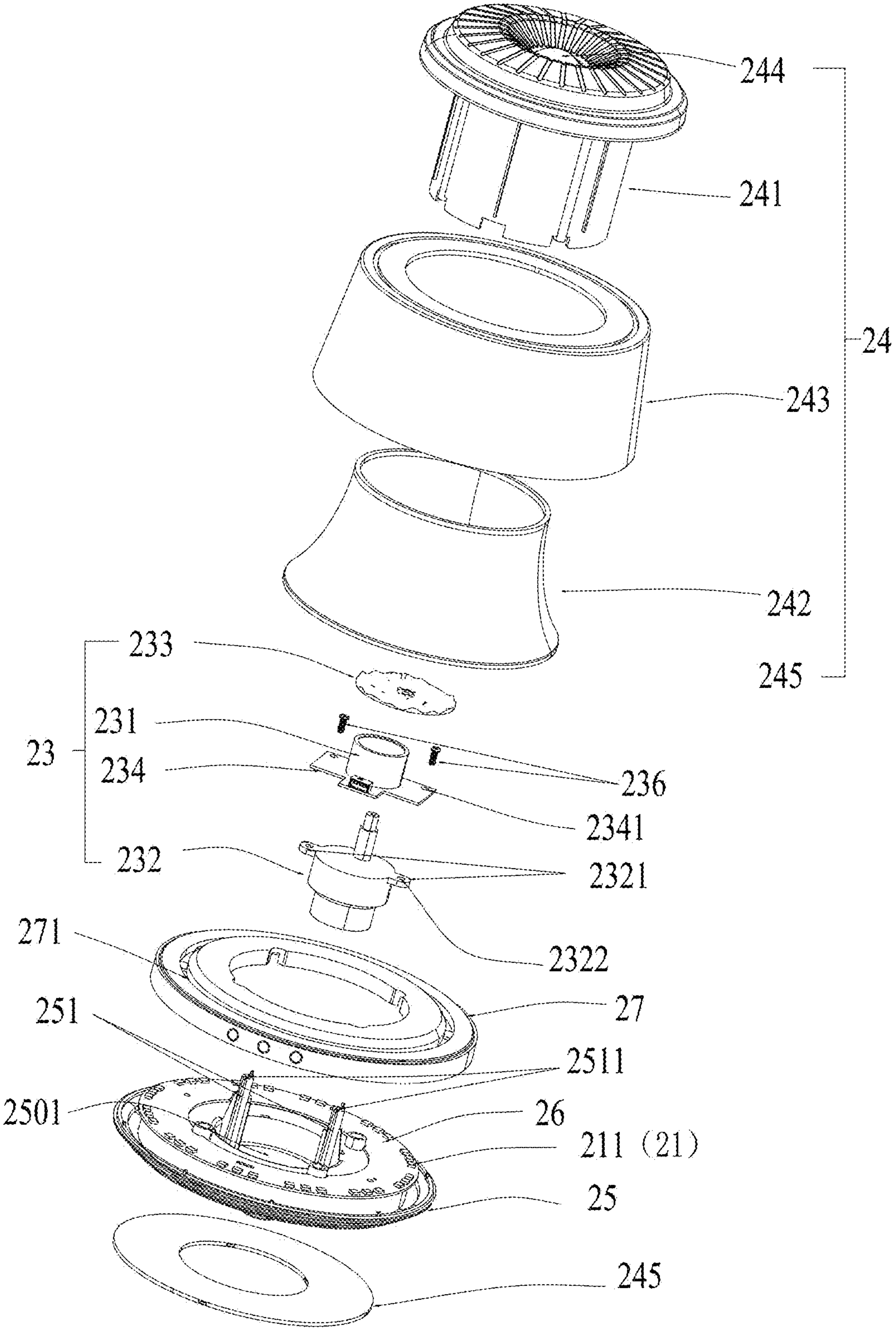
FIG. 3 is an exploded view of the ambient lamp according to the first embodiment of the present disclosure.

In this embodiment, as shown in FIG. 3, the projection lamp 20 includes a bearing base 25, a first control circuit board 26, and a lampshade assembly 24. The column lamp 10 supports the bearing base 25. The first control circuit board 26 and the lampshade assembly 24 are mounted on the bearing base 25. The lampshade assembly 24 is connected to the bearing base 25 to form an accommodating cavity. The first control circuit board 26 are arranged inside the lampshade assembly 24. The first light-emitting assembly 12 is detachably and electrically connected to the first control circuit board 26 via a plug-in/contact connection method. This detachable electrical connection method, utilizing plug-in or contact connections, makes the assembly of the column lamp and projection lamp more convenient and efficient, without the need for complex wiring soldering or fixing operations. It facilitates production assembly and subsequent maintenance. If a component malfunctions, users can directly detach the projection lamp from the column lamp for separate replacement or repair, reducing maintenance costs and operational difficulty. Additionally, the detachable design provides convenience for product transportation, as the column lamp and projection lamp can be packaged separately, reducing packaging volume and minimizing the risk of damage during transit.

Figure 4:
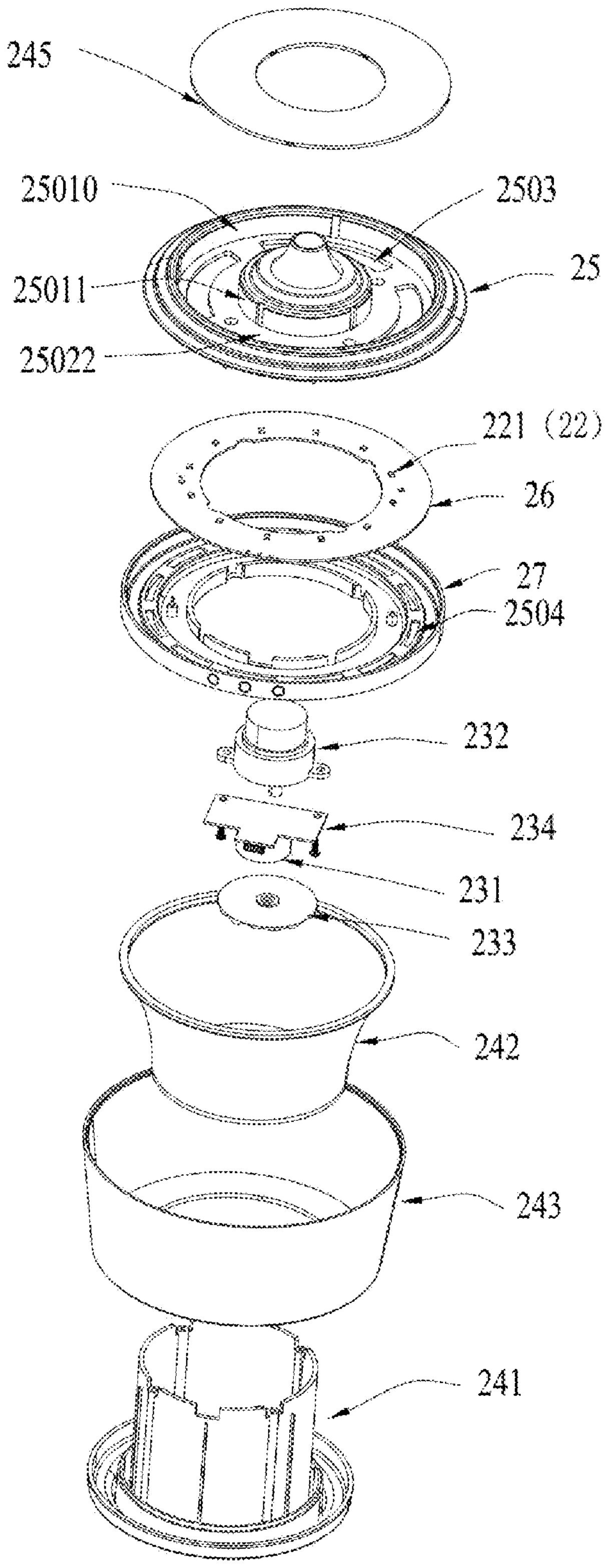
FIG. 4 is a schematic diagram of the ambient lamp according to the first embodiment of the present disclosure from another perspective.
Figure 5:
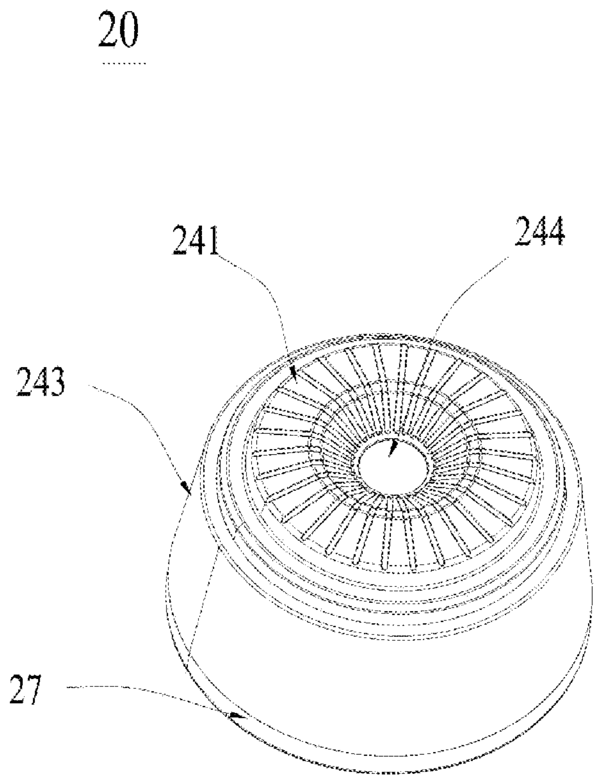
FIG. 5 is a schematic view of a projection lamp of the ambient lamp according to the first embodiment of the present disclosure.
Figure 6:
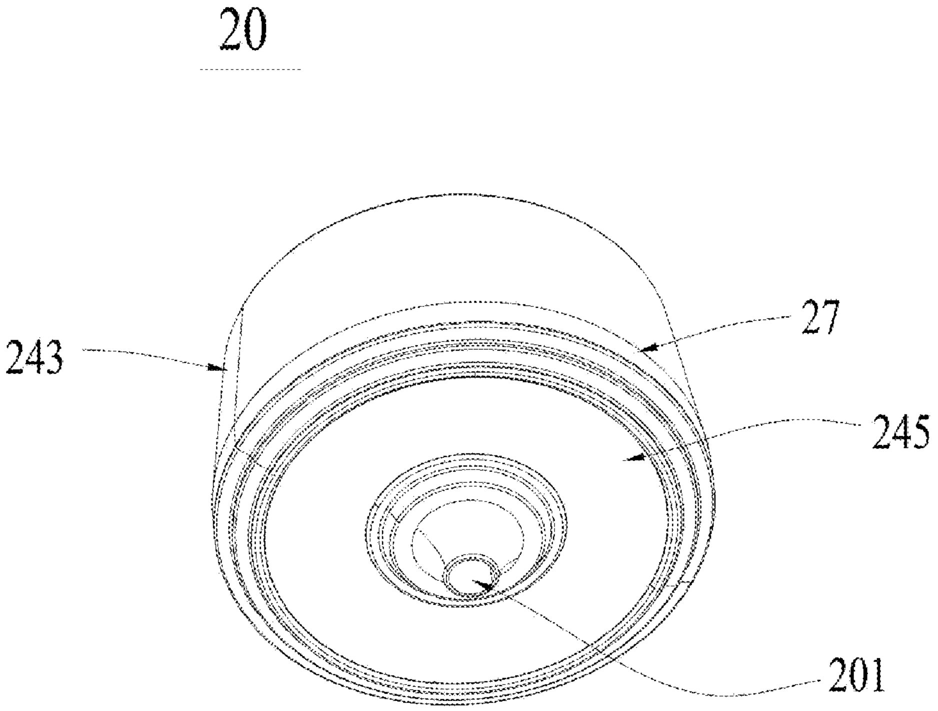
FIG. 6 is a schematic view of a projection lamp of the ambient lamp according to the first embodiment of the present disclosure from another perspective.

In this embodiment, as shown in FIGS. 3-4, the projection lamp 20 further includes a second light-emitting assembly 23. The lampshade assembly 24 covers the second light-emitting assembly 23. The light emitted by the second light-emitting assembly 23 is directed away from the column lamp 10 and passes through the lampshade assembly 24 to be projected onto external objects (such as ceilings, screens, walls, or other external objects). When the light from the second light-emitting assembly 23 is projected onto these external objects, it forms dynamic projection patterns. In this structure, the external objects primarily refer to indoor walls, but may also include partitions or indoor furniture. The light from the second light-emitting assembly projects onto external objects, creating dynamic light effects that can simulate scenes such as the universe or starry sky. This aids users in meditation and relaxation, helping to alleviate daily stress.

In this embodiment, as shown in FIGS. 3-4, the projection lamp 20 further includes a third light-emitting assembly 21. The lampshade assembly 24 covers the third light-emitting assembly 21, which is arranged adjacent to an inner peripheral surface of the lampshade assembly 24. The light from the third light-emitting assembly 21 is projected sideways, providing wide-ranging basic illumination to ensure brightness and clarity in indoor spaces. It further can be switched to a colorful lighting mode according to user preferences.

In this embodiment, as shown in FIG. 4, the projection lamp 20 further includes a fourth light-emitting assembly 22. The lampshade assembly 24 covers the fourth light-emitting assembly 22, and the light emitted by the fourth light-emitting assembly 22 is directed toward the column lamp 10 and surrounds it. The fourth light-emitting assembly 22 is positioned in a relatively concealed area with soft lighting, and light emitted by the fourth light-emitting assembly 22 provides gentle, localized basic illumination suitable for user rest periods.

It can be understood that, in some embodiments, the third light-emitting assembly 21 and the fourth light-emitting assembly 22 are located within the accommodating cavity and are electrically connected to the second light-emitting assembly 23. They can be arranged around a periphery of the second light-emitting assembly 23 and the drive module 232, respectively, to emit light toward the top side of the projection lamp 20, the bottom side of the projection lamp 20, and/or the peripheral sides of the projection lamp 20 other than the top and bottom sides.

Specifically, the three light-emitting assemblies described above work in cooperation to achieve combinations of various lighting directions. This allows users to select different lighting effects for different environments, thereby providing a rich and diverse light-and-shadow experience. It significantly enhances practicality and appeal of the ambient lamp.

In this embodiment, as shown in FIGS. 3-4, the third light-emitting assembly 21 includes multiple first LED beads 211. These multiple first LED beads 211 are arranged on a side of the first control circuit board 26 facing away from the column lamp 10 in a surrounding manner. The fourth light-emitting assembly 22 includes multiple second LED beads 221 arranged on a side of the first control circuit board 26 facing toward the column lamp 10 in a surrounding manner. The first control circuit board 26 is arranged on a side of the bearing base 25 facing away from the column lamp 10, and the bearing base 25 is provided with first light-transmitting holes 2503 corresponding to the multiple second LED beads 221. By integrating power supply for the third light-emitting assembly 21 and the fourth light-emitting assembly 22 onto the first control circuit board 26, arrangement of multiple circuit boards is avoided, simplifying circuit layout and minimizing wiring complexity. This facilitates assembly during production, saving costs while improving production efficiency. When the first LED beads 211 and the second LED beads 221 are arranged on the first control circuit board 26 in a surrounding manner, they may be positioned as close as possible to an inner edge of the circuit board to avoid excessive light concentration and localized high brightness. This arrangement allows light to diffuse more evenly in all directions, ensuring that the third and fourth light-emitting assemblies create soft and appropriately sized lighting effects from the side and the bottom of the projection lamp 20, respectively.

In this embodiment, as shown in FIGS. 3-4, the second light-emitting assembly 23 includes a projection light 231, a drive module 232, a light-transmitting sheet 233, and a second control circuit board 234. The second control circuit board 234 is electrically connected to the first control circuit board 26. The drive module 232 is arranged on the bearing base 25, enhancing the stability of its installation. The second control circuit board 234 is arranged on the drive module 232 and electrically connected to the drive module 232. The projection light 231 is mounted on the second control circuit board 234. The light-transmitting sheet 233 is connected to an output end of the drive module 232 and located above the projection light 231. Once activated, the drive module 232 drives the light-transmitting sheet 233 to rotate. The light from the projection light 231 sequentially passes through the rotating light-transmitting sheet 233 and the lampshade assembly 24, projecting dynamic light patterns onto the external objects. The drive module 232 is arranged on the bearing base 25, leveraging the base's stability to counteract vibration generated during rotation of the driving module 232. This prevents overall shaking of the light assembly, ensuring smooth rotation of the light-transmitting sheet 233 and stable, jitter-free, and non-shifting light projections. Specifically, many existing products simulate dynamic effects through blinking LEDs or alternating colors, resulting in harsh and flat lighting without depth. In contrast, this embodiment utilizes the rotating light-transmitting sheet 233 to naturally create wavy light patterns, with flow trajectories mimicking celestial clouds or ocean waves. This produces a soft, realistic visual effect without causing eye strain, significantly enhancing user satisfaction. Furthermore, the second control circuit board can adjust a rotational speed of the drive module 232, enabling stepless regulation from fast to slow wave motion—for instance, low speed for sleep scenarios and high speed for entertainment scenarios. Compared to traditional dynamic lights with fixed modes, the present disclosure offers greater adaptability to diverse scenarios. A top surface of the light-transmitting sheet 233 is an uneven plane with protrusions and recesses, while its back surface (the side facing the projection light 231) is flat. As light from the projection light 231 passes through the light-transmitting sheet 233, it converges at protruding parts, resulting in higher brightness, while recessed parts do not converge light, creating lower brightness. This contrast between concentrated and diffused light produces a distinct wavy pattern.

It can be understood that the drive module 232 may include a motor, which can be mounted on the bearing base 25. An output shaft of the motor is connected to the light-transmitting sheet 233, thereby driving the light-transmitting sheet 233 to rotate.

Figure 19:
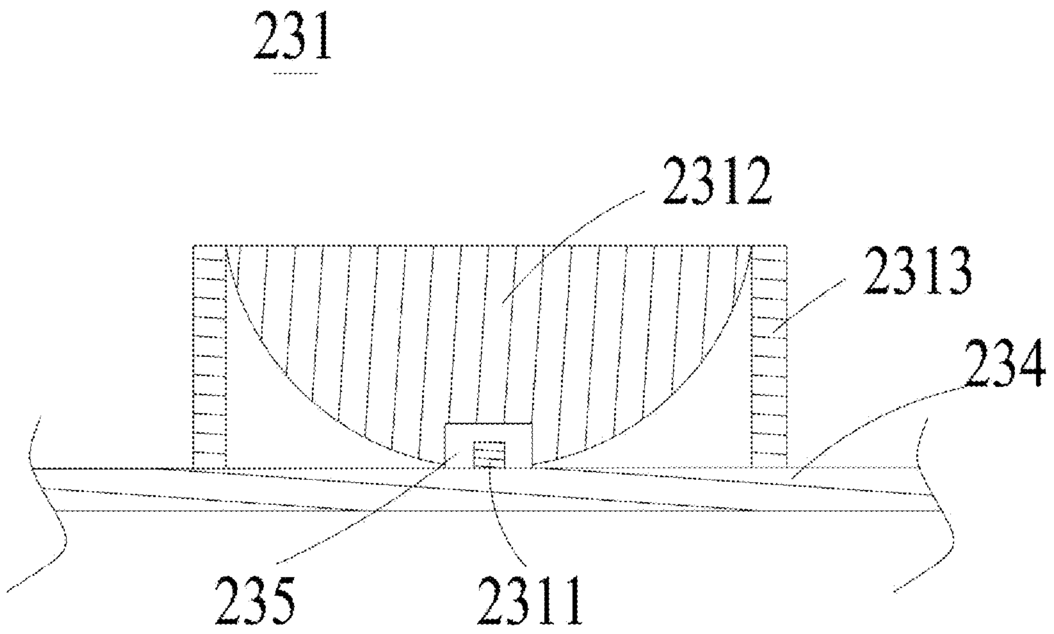
FIG. 19 is a partial schematic view of an ambient light of the projection lamp in FIG. 18.
Figure 20:
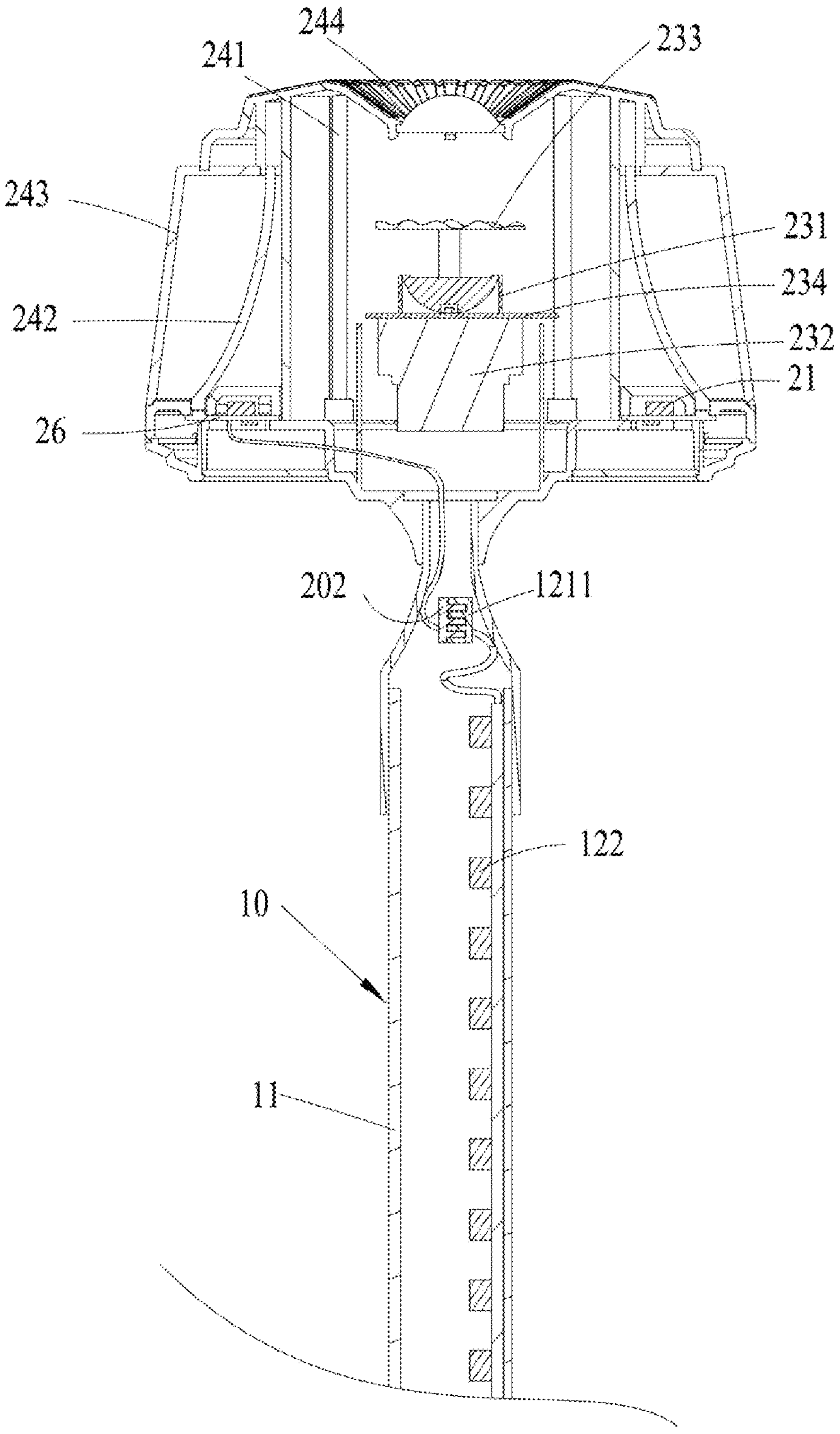
FIG. 20 is a cross-sectional view of the ambient lamp according to a third embodiment of the present disclosure, where the column lamp and the projection lamp are connected with each other.

In this embodiment, as shown in FIG. 19, the projection light 231 includes a light-emitting element 2311 mounted on the second control circuit board 234, a light-converging lens 2312 covering the light-emitting element 2311, and a housing 2313 fixed around a periphery of the light-converging lens 2312. A bottom of the light-converging lens 2312 contacts the second control circuit board 234 and defines a receiving groove 235 for accommodating the light-emitting element 2311.

Figure 7:
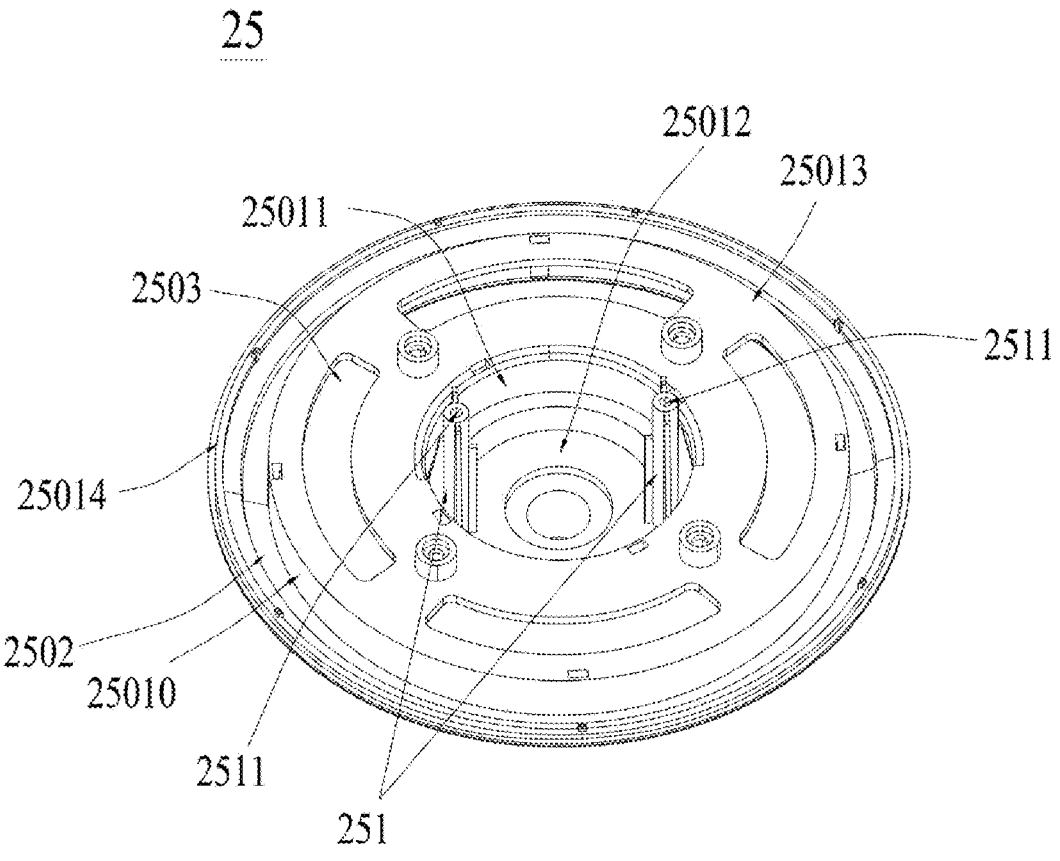
FIG. 7 is a schematic view of a bearing base of the ambient lamp according to the first embodiment of the present disclosure.
Figure 8:
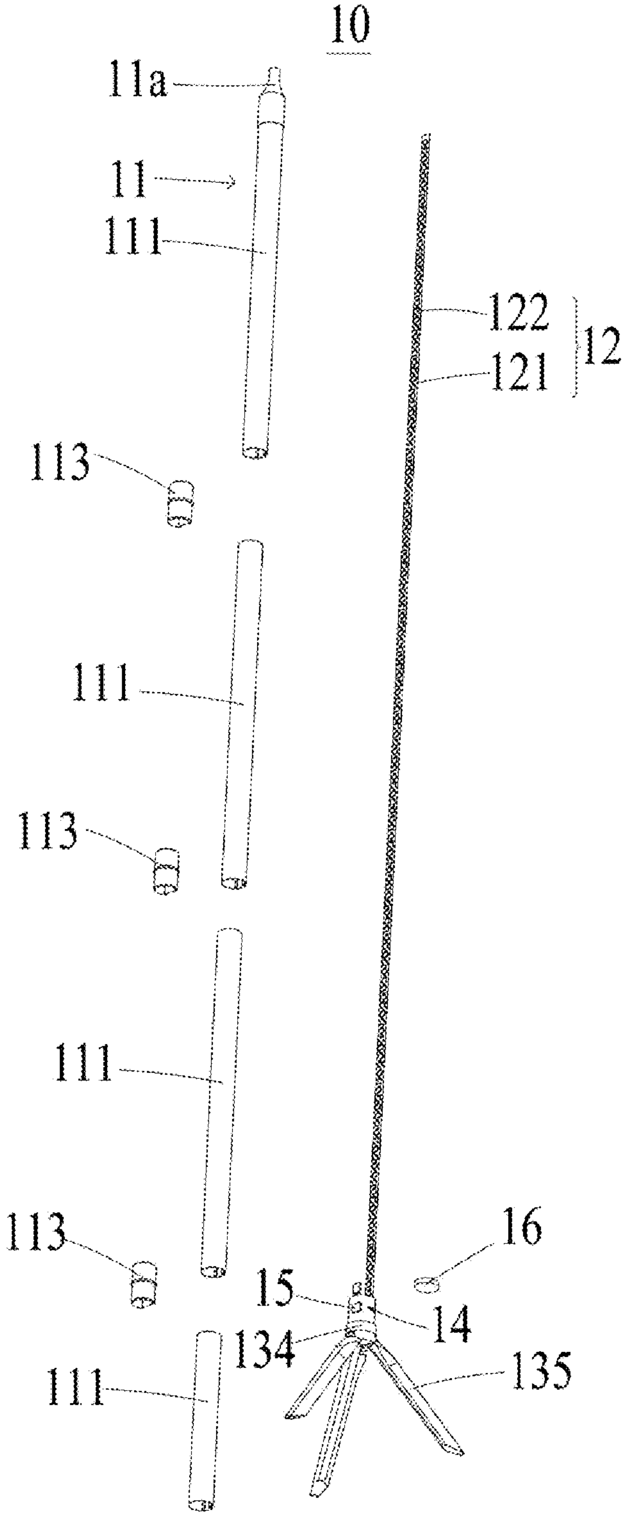
FIG. 8 is a schematic view of a column lamp of the ambient lamp according to the first embodiment of the present disclosure.

In this embodiment, as shown in FIGS. 3 and 7, the bearing base 25 is provided with two support columns 251 arranged symmetrically about an axis of the bearing base. The two support columns 251 are opposite to each other and identical in size and shape. A top of each support column 251 is provided with a first mounting hole 2511. The drive module 232 is provided with fixing lugs 2321 corresponding to the support columns 251. Each fixing lug 2321 is provided with a second mounting hole 2322 corresponding to the first mounting hole 2511. The second control circuit board 234 is provided with third mounting holes 2341 corresponding to the second mounting holes 2322. A fastener 236 sequentially passes through the third mounting hole 2341, the second mounting hole 2322, and the first mounting hole 2511 to mount the second control circuit board 234 and the drive module 232 onto the support columns 251. The fastener 236 can be a screw, bolt, or the like. Allowing the fastener 236 to pass through the components along the same axis ensures uniform transmission of clamping force, achieving integrated fixation of the drive module 232, the second control circuit board 234, and the support columns 251. This replaces connection methods such as adhesive bonding or snap-fits, which are prone to loosening, guaranteeing no detachment during long-term use and enhancing overall structural stability. The support columns 251 provide elevated, stable support for the drive module 232 and the second control circuit board 234, preventing direct contact of the components with the bearing base to counteract vibration. Furthermore, the elevated support of the symmetrical support columns 251 promotes air circulation, effectively dissipating heat generated by the drive module 232 during operation. Specifically, the structural configuration featuring symmetrical support, coaxial positioning, and integrated fixation ensures precision and stability of the dynamic wave light effects. It guarantees that even with high-frequency use of the second light-emitting assembly 23, users will not experience light pattern deviation or flicker. This ensures durability and reliability of the dynamic effects and extends the service life of the ambient lamp.

In this embodiment, as shown in FIGS. 3-6, the third light-emitting assembly 21 is arranged around a periphery of the second light-emitting assembly 23. The lampshade assembly 24 includes a light-shielding cover 241, a light-transmitting cover 242, a protective shell 243, and a lens 244. The second light-emitting assembly 23 is arranged inside the light-shielding cover 241. The light-transmitting cover 242 provides uniform light transmission for the third light-emitting assembly 21, ensuring its light passes through without uneven brightness. The light-transmitting cover 242 is housed within the protective shell 243. The protective shell 243 protects the light-transmitting cover 242 from damage and further serves functions such as dust prevention and water stain resistance. Moreover, the protective shell 243 adds a sense of structural layering to the overall projection lamp, enhancing its aesthetic appeal. The light-shielding cover 241 covers the projection light 231 and is configured to isolate the light emitted by the third light-emitting assembly 21 from the light emitted by the second light-emitting assembly 23, preventing direct spatial crossover of the two light beams. The lens 244 is arranged at a top of the light-shielding cover 241. The light from the second light-emitting assembly 23 passes through the lens 244 and projects onto the external object. The lens 244 is hemispherical in shape, which magnifies the dynamic wave light from the second light-emitting assembly 23 when projected onto the external object, allowing the dynamic wave light to cover the external object as much as possible. Of course, if full coverage cannot be achieved, manufacturers can set the size according to different actual needs, and users can purchase accordingly. Alternatively, it could be designed to allow replacement of the lens 244 in different sizes or adjustment of a distance between the projection light 231 and the light-transmitting sheet 233. However, the present disclosure does not focus on protecting structures related to how to replace the lens 244 or to adjust the distance between the projection light 231 and the wave plate. Any suitable structures capable of achieving replacement of the lens 244 or adjustment of the distance between the projection light 231 and the wave plate can be used. The light-transmitting cover 242 is configured to cover the third light-emitting assembly 21. The light from the third light-emitting assembly 21 passes sequentially through the light-transmitting cover 242 and the protective shell 243. The lampshade assembly 24 further includes a light-transmitting plate 245. The light-transmitting plate 245 is arranged at a bottom of the bearing base 25. The light from the fourth light-emitting assembly 22 passes through the light-transmitting plate 245 and is directed toward the column lamp 10. Specifically, in traditional multi-light ambient lamps without physical isolation, side light easily scatters to the top through diffuse reflection, and top light easily spills to the sides, causing light pattern overlap and blurry contours of wave light/side light. In this embodiment, the physical internal/external zoning layout achieved by the light-shielding cover 241 isolates the light paths. The light from the third light-emitting assembly 21 projects only sideways through the light-transmitting cover 242 and protective shell 243. The light from the second light-emitting assembly 23 projects only upward through the lens 244. The fourth light-emitting assembly 22 is directed toward the column lamp 10. The three light paths are completely independent, with no crossover interference, solving technological problems of light pattern crossover interference, distorted projection effects, resulting in overlapping patterns and blurry contours of wave light/side light.

In this embodiment, as shown in FIGS. 3, 4, and 7, the first control circuit board 26 is arranged on the side of the bearing base 25 facing away from the column lamp 10. The bearing base 25 is provided with first light-transmitting holes 2503 corresponding to the multiple second LED beads 221. It should be understood that, in other embodiments, the first control circuit board 26 may be arranged on the side of the bearing base 25 facing the column lamp 10, in which case the first light-transmitting holes 2503 would serve as the passages for light emitted by the first LED beads 211.

In this embodiment, as shown in FIGS. 4 and 7, the bearing base 25 includes an inner side wall 25010, a central annular wall 25011 arranged at a center of the bearing base 25, a central bottom wall 25012, a top wall 25013 connecting between the inner side wall 25010 and the central annular wall 25011, and an annular rim 25014 surrounding an outer side of the central annular wall 25011 and the top wall 25013. The central annular wall 25011 extends from a periphery of the central bottom wall 25012 in a direction away from the column lamp 10. The central annular wall 25011 and the central bottom wall 25012 are connected to form a first mounting groove 2501. This first mounting groove 2501 accommodates part of the second light-emitting assembly 23, aligning the center of gravity of the bearing base with the central axis of the second light-emitting assembly 23 to reduce wobble during the rotation of the drive module. Part of the second light-emitting assembly 23 is located within the first mounting groove 2501. A second mounting groove 2502 is defined between the inner side wall 25010 and the annular rim 25014. One end of the light-shielding cover 241 is installed in the second mounting groove 2502, and a side wall of the end of the light-shielding cover 241 is positioned adjacent to the annular rim 25014. The central annular wall 25011 and the inner side wall 25010 of the bearing base 25 together form an annular third mounting groove 25022 on the side of the bearing base 25 facing the column lamp 10. The first control circuit board 26 is arranged on the side of the top wall 25013 facing away from the column lamp 10. The first light-transmitting holes 2503 are provided on the top wall 25013 and is configured to allow light emitted by the fourth light-emitting assembly 22, which is arranged on the side of the first control circuit board 26 facing the column lamp 10, to project toward the column lamp 10 through the first light-transmitting holes 2503. The light-transmitting plate 245 is installed within the second mounting groove 2502. This modular structural configuration makes assembly simple and clear. The integrated molding of the bearing base reduces assembly steps, improves production efficiency, and ensures precise positioning of all components, guaranteeing stability of the overall structure. Specifically, the matching design of the first mounting groove and the second light-emitting assembly makes installation of the second light-emitting assembly on the bearing base more stable, avoiding wobble caused by the rotation of the drive module and ensuring the stable presentation of the dynamic wave light effects. Meanwhile, the light-shielding cover, installed within the first mounting groove and covering the second light-emitting assembly, not only provides optical isolation but also enhances the aesthetic appeal of the overall structure. The second mounting groove 2502 is configured to accommodate the protective shell 243. The arrangement of the third mounting groove 25022 provides reasonable installation positions for the first control circuit board 26 and the light-transmitting plate 245. The first control circuit board 26, located on the side of the top wall 25013 facing the second light-emitting assembly 23, facilitates an electrical connection to the second light-emitting assembly. The light-transmitting plate 245 is arranged in the third mounting groove 25022 and is configured to allow light from the fourth light-emitting assembly to pass therethrough toward the column lamp 10, achieving the function of localized, soft, and basic illumination. This modular and integrated configuration makes the entire ambient lamp structure more compact and rational, enhancing the product's practicality.

In this embodiment, as shown in FIGS. 3 and 4, the projection lamp 20 further includes a mounting piece 27. The mounting piece 27 is arranged corresponding to the first control circuit board 26 and covers the first control circuit board 26. The mounting piece 27 is provided with second light-transmitting holes 2504 corresponding to the first LED beads 211. Specifically, the mounting piece 27 adopts a shape and size that match the bearing base 25. It is tightly fitted over the first control circuit board via fixing methods such as clips or screws, forming a stable enclosed structure. This enhances the overall structural stability and prevents damage to the first control circuit board 26 during severe vibration. The second light-transmitting holes 2504 may be individual holes corresponding to each first LED bead 211 or segmental holes. The mounting piece 27 is provided with an annular groove 271 configured to accommodate the light-transmitting cover 242. The light from the first LED beads 211 sequentially passes through the second light-transmitting holes 2504 and the annular groove 271, then through the light-transmitting cover 242 and the protective shell 243.

In this embodiment, the third light-emitting assembly 21 emits colored light. This colored light is transmitted in a surrounding manner, enhancing the ambient effect. Users can employ it when needing to create an atmosphere. However, it can further be adjusted to emit simple warm light or incandescent-like light, meeting users' needs for wider illumination. The light emitted by the fourth light-emitting assembly 22 is primarily monochromatic, such as single-color warm light, mainly used for small-area illumination during user rest periods without disturbing them. The second light-emitting assembly 23 emits colored/monochromatic light. The colored mode intensifies the visual layers of the dynamic waves, while the monochromatic mode highlights the flow of the wave patterns, offering users a choice. The control switches for turning on/off and adjusting the lighting effects of the third light-emitting assembly 21, the fourth light-emitting assembly 22, and the second light-emitting assembly 23 are primarily operated via an ambient lamp remote control. The remote control is equipped with multiple function buttons corresponding to turning on/off different light-emitting assemblies and adjusting their lighting effects. Users can easily switch between different lighting modes and adjust parameters such as brightness, color, and dynamic effects by lightly pressing the corresponding buttons. How the remote control manages the first circuit board to enable light adjustment is not the key technical focus of this embodiment and, as it is existing technology, which will not be elaborated further here.

In this embodiment, as shown in FIGS. 3 and 4, the shape of the light-transmitting cover 242 is a hollow truncated cone. An upper end and a lower end of the light-transmitting cover 242 defines circular openings respectively. A diameter of the opening at the upper end is smaller than that at the lower end, thus in a flared, hollow structure that is "wider at the bottom and narrower at the top". The light-transmitting cover 242 has an inwardly curved waistline. The light-transmitting cover 242 reflects and guides the upward light emitted by the third light-emitting assembly 21, diffusing it toward the side of the lampshade assembly. This results in a wider illumination area and more even light distribution, preventing waste of light directed upward while reducing harsh glare from the top. The curved side surface helps soften direct light, making it gentler and less glaring, thereby improving user comfort.

In the first embodiment, as shown in FIGS. 8-13, the support column 11 includes multiple hollow column sections 111. These multiple hollow column sections 111 are detachably connected. Each hollow column section 111 is provided with a first mounting channel 1111 inside. The first light-emitting assembly 12 includes a light panel 121 and multiple third LED beads 122 arranged on the light panel 121. One end of the light panel 121 is provided with a second electrical connector 1211 electrically connected to a first electrical connector 202 on the projection lamp 20. When the multiple hollow column sections 111 are connected, the first mounting channel 1111 on each hollow column section 111 align to form a continuous channel. The light panel 121 is installed inside the multiple hollow column sections 111 through the continuous channel.

The use of multiple detachably connected hollow column sections allows users to flexibly increase or decrease the number of hollow column sections 111 based on actual needs, which is convenient to adjust the overall height of the light assembly to fit different heights in various spaces. For example, 3-4 sections can be assembled for a tall profile in a living room, while only 1-2 sections can be used to lower the height in a bedroom. When stored, disassembled hollow column sections 111 are compact and easy to store. Furthermore, the detachable connection facilitates product transportation, as the hollow column sections 111 can be stacked for packaging, saving shipping space. The aligned design of the first mounting channels ensures that the light panel 121 can pass smoothly through the entire support column 11. The light panel 121 has good flexibility and can extend naturally along the shape of the connected hollow column sections, ensuring the electrical connectivity and lighting stability of the third LED beads. The third LED beads are evenly spaced along the length of the light panel 121. Once the light panel 121 is installed inside the hollow column sections 111, the light emitted by the third LED beads 122 can project outward through the side walls of the hollow column sections 111. The light panel 121 is made of a bendable FPC material. Configuration of the light panel 121 makes the installation of the first light-emitting assembly 12 more convenient, eliminating the need for complex fixing structures. It only requires passing the light panel 121 through the first mounting channels, which can reduce assembly difficulty and production costs. The first mounting channels in the hollow column sections protect the light panel's wiring, preventing exposure and damage from external forces, thereby extending its service life. Electrical connections between adjacent column sections 111 can be achieved via built-in plugs and sockets, allowing for plug-and-play assembly without additional wiring, which is convenient for users. The light panel 121 can be a Flexible Printed Circuit (FPC), making it easy to store flexibly. It is also lightweight, facilitating transportation.

Figure 13:
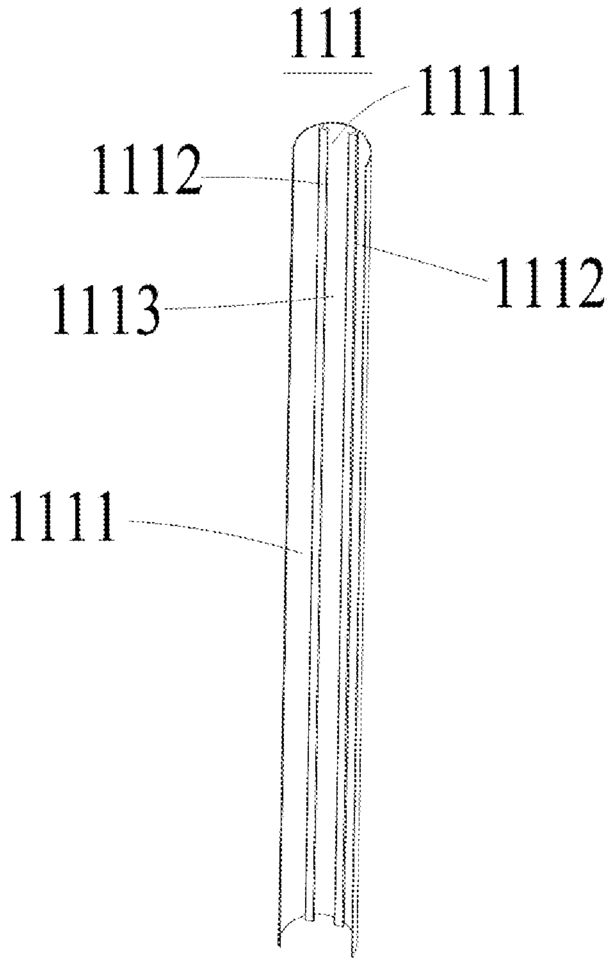
FIG. 13 is a cross-sectional view of a hollow column section of the column lamp of the ambient lamp according to the first embodiment of the present disclosure.

In this embodiment, as shown in FIG. 13, the inner wall of each hollow column section 111 is connected to two limiting plates 1112 extending along the length of the column section 111. The two limiting plates 1112 are arranged opposite to each other with a gap 1113 between them. These two limiting plates 1112, together with the inner wall of the hollow column section 111, form the first mounting channel 1111. The gap formed by the two limiting plates provides a clamping and positioning space for the light panel 121, ensuring it remains centered or in a preset position within the hollow column section and preventing displacement caused by shaking or vibration. The first mounting channel formed by the limiting plates and the inner wall has a guiding function. During installation, the first mounting channel can guide the light panel 121 to be passed through smoothly, reducing assembly difficulty and improving efficiency. The size of the gap between the two limiting plates can be set according to the width of the light panel 121, enhancing versatility and flexibility of the structure.

Figure 10:
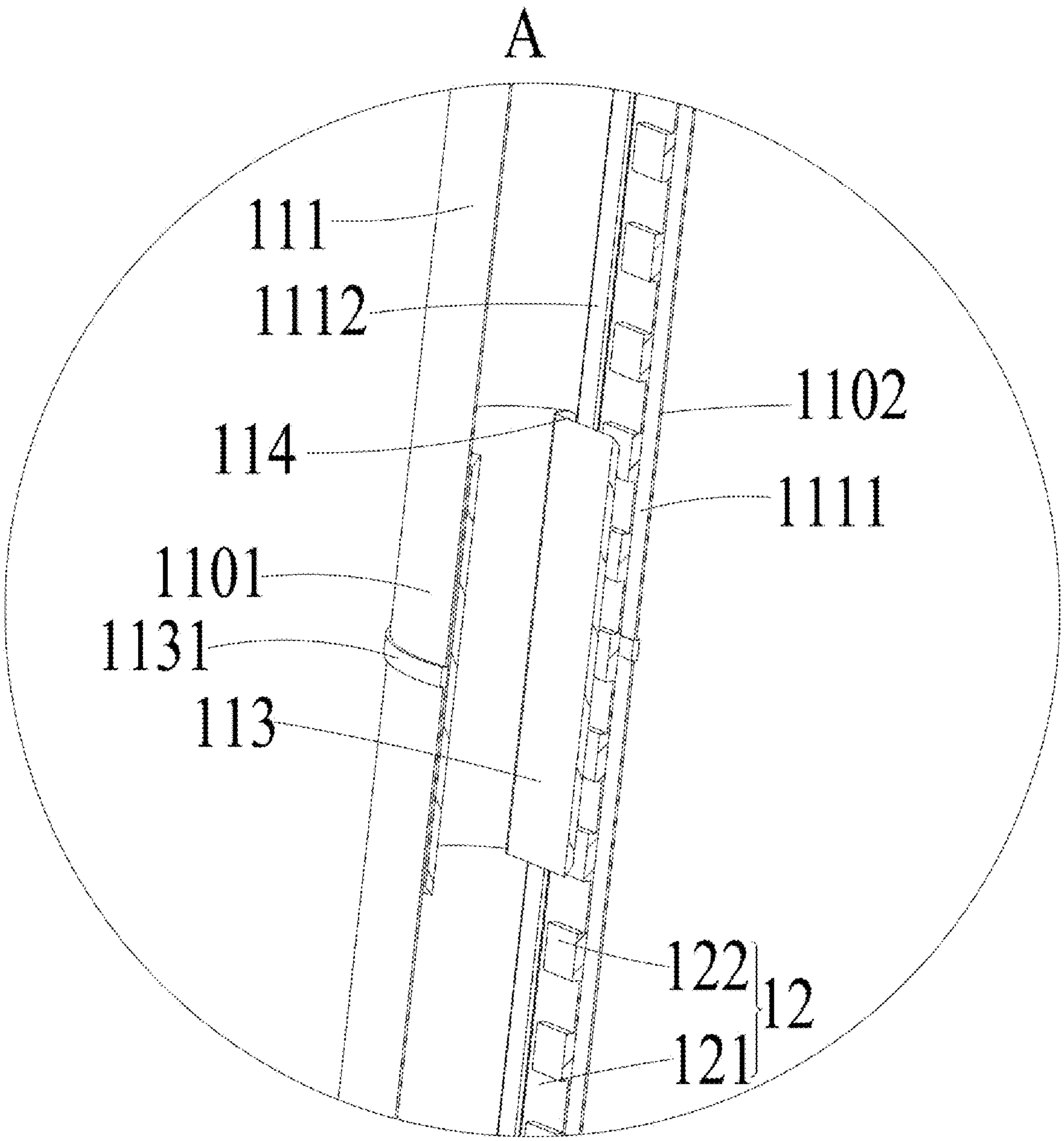
FIG. 10 is an enlarged view of the portion A in FIG. 9.
Figure 12:
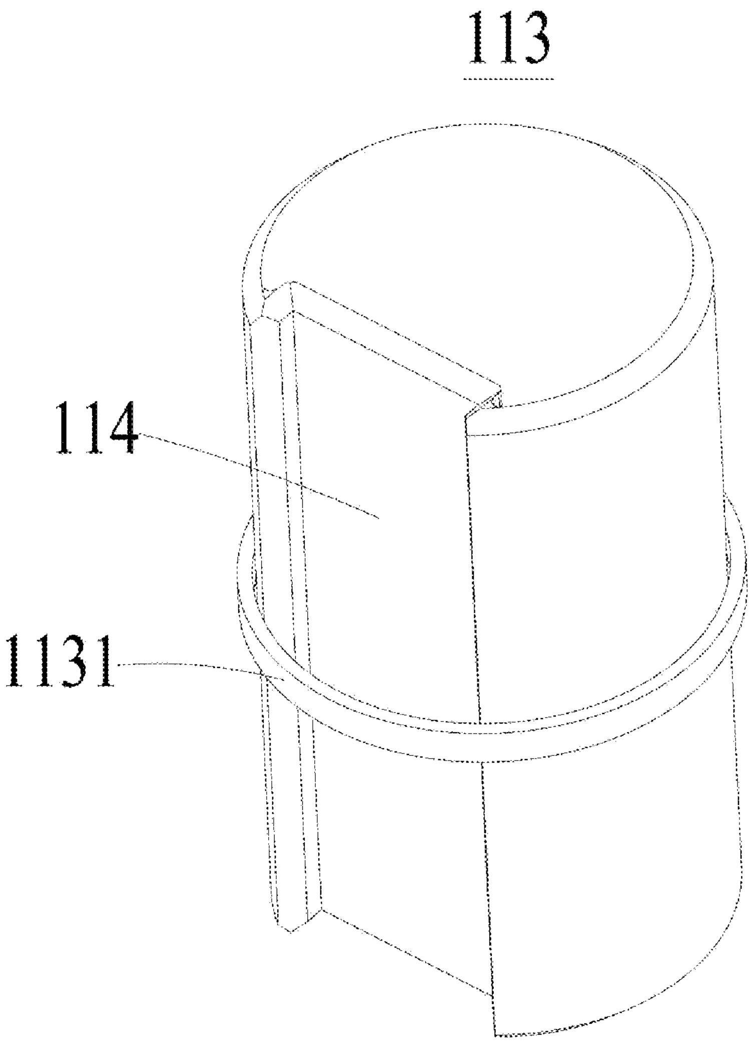
FIG. 12 is a schematic view of a connection joint of the column lamp of the ambient lamp according to the first embodiment of the present disclosure.

In this embodiment, as shown in FIGS. 10 and 12, the support column 11 further includes connection joints 113. One end of the connection joint 113 is inserted into one of two adjacent hollow column sections 111, and the other end is inserted into another of the two adjacent hollow column sections 111. The outer side surface of the connection joint 113 is provided with a clamping groove 114, which engages with both sides of the two limiting plates 1112. The connection joint 113 forms a tight snap-fit with the two limiting plates on the inner walls of the adjacent hollow column sections 111 via the clamping groove, achieving quick positioning and a stable connection between the two adjacent hollow column sections 111. This ensures multiple hollow column sections maintain coaxial alignment after assembly, preventing tilting or misalignment. This snap-fit structure simplifies the assembly process, allowing users to connect the hollow column sections without additional tools, enhancing installation convenience.

In this embodiment, as shown in FIGS. 10 and 12, the connection joint 113 is provided with a limiting ring 1131 on its outer side. The limiting ring 1131 is used to limit the insertion position of two adjacent hollow column sections 111. Preferably, the limiting ring 1131 is annularly arranged at the middle of the connection joint 113 along its length direction. When two adjacent hollow column sections 111 are connected via the connection joint 113 through insertion, the limiting ring 1131 limits an insertion depth of the connection joint 113 in the two adjacent hollow column sections 111. An end of one of the two adjacent hollow column sections 111 is sleeved over one end of the connection joint 113 and moved towards the limiting ring 1131 until an end face of the one of the two adjacent hollow column sections 111 abuts against one side of the limiting ring 1131. Similarly, an end of the other of the two adjacent hollow column sections 111 is sleeved over the other end of the connection joint 113, abutting against the opposite side of the limiting ring 1131. In this way, relative positions of the two adjacent hollow column sections 111 are fixed by the limiting ring 1131, ensuring a consistent spacing between each two adjacent hollow column sections 111 after assembly. The presence of the limiting ring 1131 further allows users to intuitively judge, through touch or sight, whether the insertion is complete during assembly, enhancing convenience and accuracy, and further optimizing the user's assembly experience.

Figure 9:
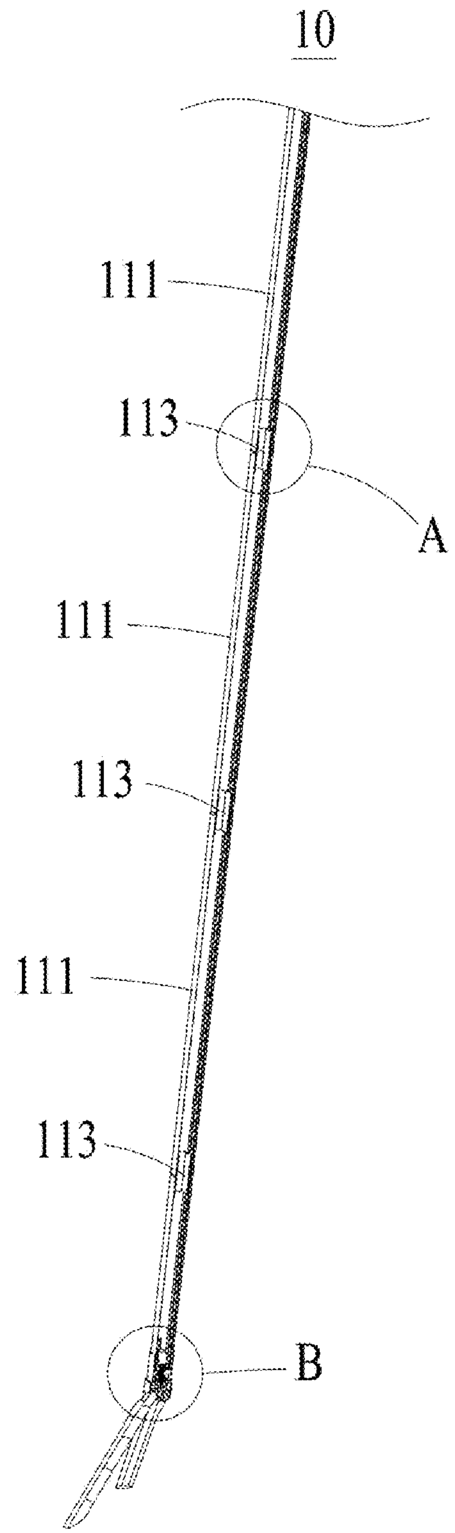
FIG. 9 is a cross-sectional view of the column lamp of the ambient lamp according to the first embodiment of the present disclosure.

In this embodiment, as shown in FIGS. 8-10, the multiple third LED beads 122 are all arranged on the same side of the light panel 121. The side of the hollow column section 111 facing the third LED beads 122 is a light-transmitting surface 1101, while the side of the hollow column section 111 opposite to the third LED beads is an opaque surface 1102. By arranging the multiple third LED beads on the same side of the light panel and having the light-transmitting surface of the hollow column section corresponding to the multiple third LED beads, while having the opaque surface on the opposite side, directional light projection and efficient utilization are achieved. Specifically, the light emitted by the third LED beads can pass through the light-transmitting surface with minimal internal reflection loss within the hollow column section 111. This improves light output efficiency, making the illumination of the column lamp brighter and more focused. The opaque surface effectively blocks light from propagating in the opposite direction, preventing unnecessary light leakage and reducing light interference with other areas in the environment. It further enhances the concentration of light towards the light-transmitting surface, which makes the column lamp's lighting effect with a greater sense of depth and three-dimensionality.

Figure 11:
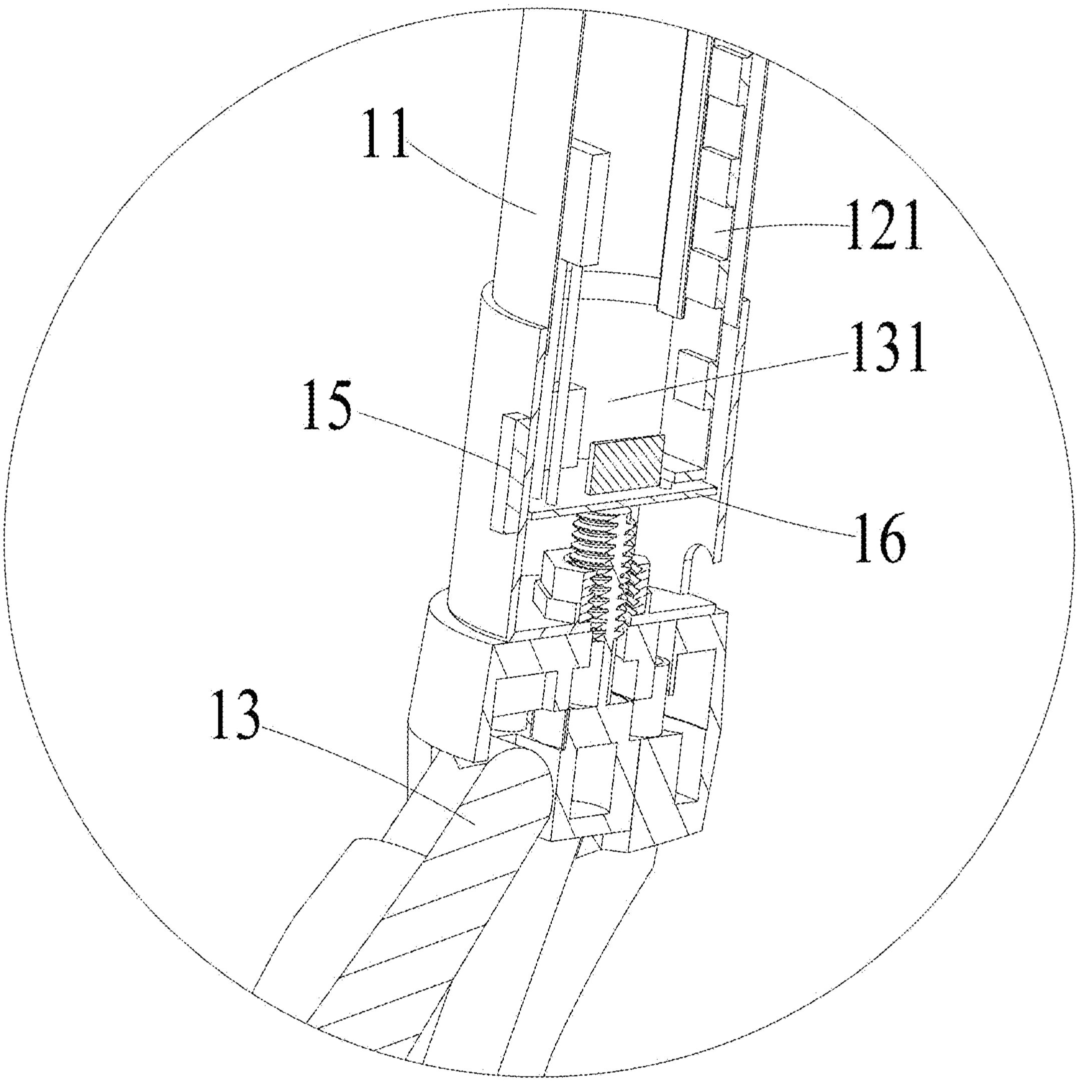
FIG. 11 is an enlarged view of the portion B in FIG. 9.

In this embodiment, as shown in FIGS. 8 and 11, the column lamp 10 further includes a support base 13, a power interface 14, a power switch 15, and a third circuit board 16. A top of the support base 13 is provided with a fourth mounting groove 131. The third circuit board 16 is arranged in the fourth mounting groove 131, and the support column 11 is inserted into the fourth mounting groove 131. The light panel 121, the power interface 14, and the power switch 15 are all electrically connected to the third circuit board 16. Furthermore, the light panel 121 can be partially stored inside the fourth mounting groove 131. The support base 13 provides a stable foundational support for the entire column lamp 10, preventing it from tipping over during daily use. The fourth mounting groove 131 offers an integrated installation space for both the support column 11 and the third circuit board 16. The support column 11 is inserted into the groove, where the close fit between the groove walls and the outer wall of the support column 11 provides initial positioning. Combined with methods like screw fixation or interference fit, this ensures a secure connection between the support column 11 and the support base 13, preventing wobbling. The power interface 14 is configured to be connected to an external power source to supply electricity to the entire column lamp 10. The power switch 15 acts as a master switch and is configured to allow users to turn the column lamp 10 on or off entirely. When the column lamp 10 is off or when the light panel 12 needs to be stored, it can be conveniently placed inside the fourth mounting groove 131. This avoids issues such as tangling, damage, or unsightliness caused by exposed wiring, and improves the product's portability and storage neatness when the hollow column sections are disassembled for storage. This structure integrates multiple functions-support, installation, control, and storage-into the support base 13. It makes the column lamp's structure more compact and makes the layout more rational, ensuring stability and reliability during use while offering operational convenience and easy storage. Moreover, the third circuit board 16 can function as a master control board, coordinating and controlling working states of various light-emitting components in both the column lamp 10 and the projection lamp 20. It enables synchronized or independent control of their lighting effects, further enriching the ambient lamp's performance. For example, when the second light-emitting assembly of the projection lamp 10 projects dynamic wave patterns, the third LED beads of the column lamp 10 can synchronously change color or brightness, creating a visually harmonious effect. Alternatively, based on user needs, the column lamp 10 and the projection lamp 20 can be configured via remote control to operate independently, meeting personalized lighting requirements for different scenarios.

Figure 14:
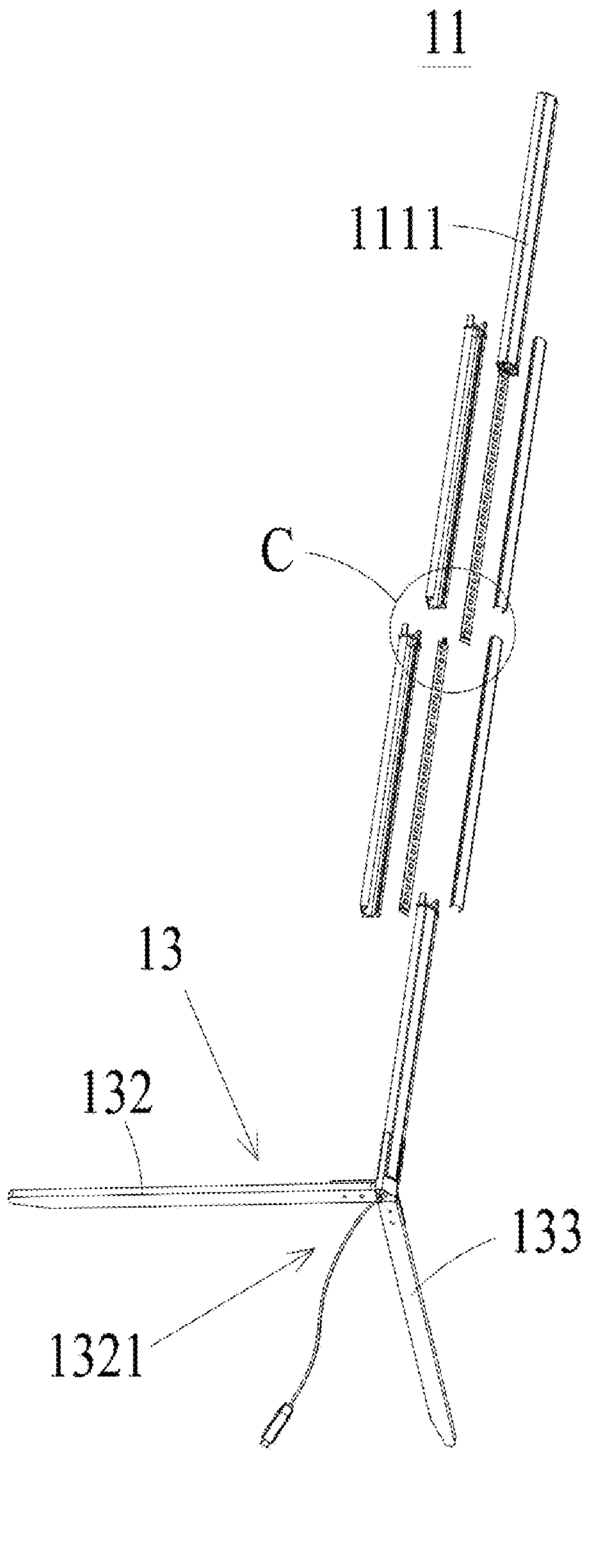
FIG. 14 is a schematic view of an ambient lamp according to a second embodiment of the present disclosure.
Figure 15:
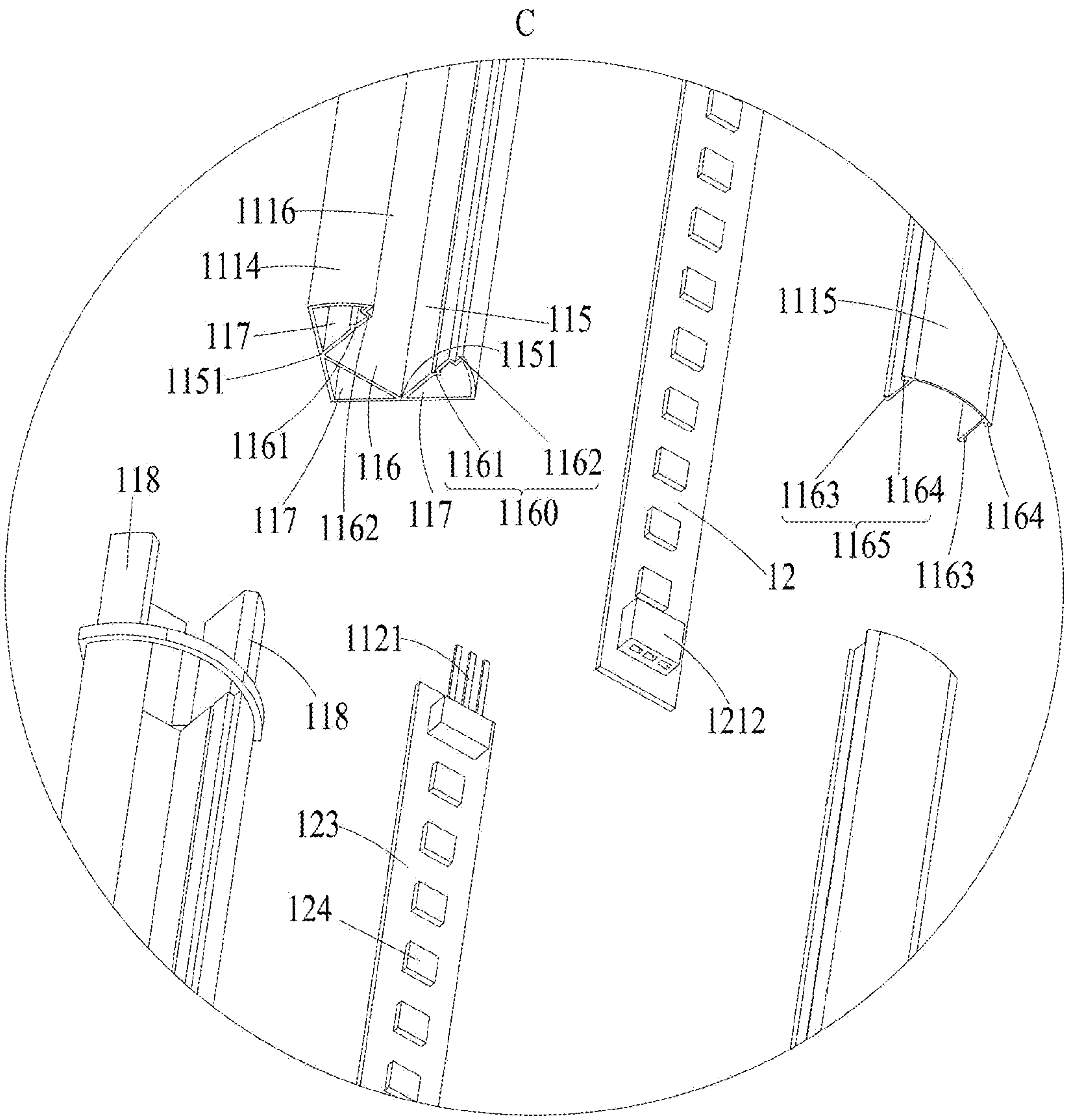
FIG. 15 is an enlarged view of the portion C in FIG. 14.
Figure 16:
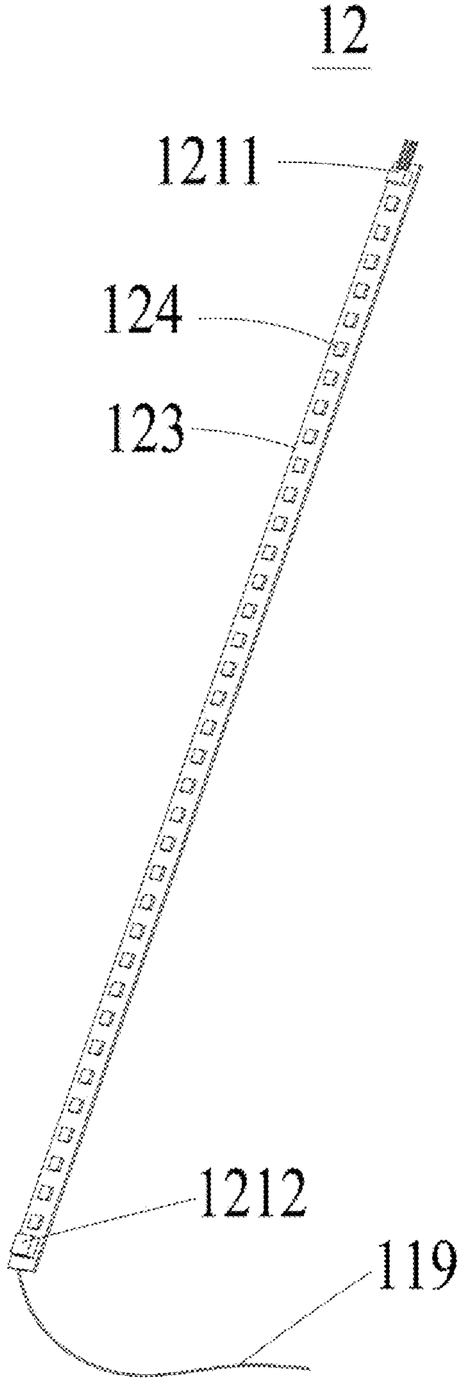
FIG. 16 is a schematic view of a first light-emitting assembly of the ambient lamp according to the second embodiment of the present disclosure.

In the second embodiment, as shown in FIGS. 14-16, the support column 11 includes multiple hollow column sections 111, which are detachably connected. The first light-emitting assembly 12 is installed within the multiple hollow column sections 111. One end of the first light-emitting assembly 12 is provided with a second electrical connector 1211, and the other end is provided with a third electrical connector 1212. When two adjacent hollow column sections 111 of the hollow column sections 111 are connected, the second electrical connector 1211 of the first light-emitting assembly 12 in one hollow column section can be electrically plugged into the third electrical connector 1212 of the first light-emitting assembly 12 in the adjacent hollow column section. The second electrical connector 1211 or the third electrical connector 1212 can be used to plug into a first electrical connector 202 provided on the projection lamp 20. This configuration achieves a quick and stable electrical connection between the first light-emitting assemblies in adjacent hollow column sections, ensuring smooth current transmission and guaranteeing the normal illumination of the third LED beads. Specifically, when multiple hollow column sections are assembled via connection joints, the second electrical connector of the first light-emitting assembly in one section can precisely align and plug into the third electrical connector of the assembly in the adjacent section. This eliminates the need for users to perform complex manual wiring connections, simplifying the assembly process and enhancing a quick and convenient user assembly experience. The plug-in electrical connection structure allows the circuit connection to be conveniently completed or disconnected in sync when the first light-emitting assembly is installed or removed along with the hollow column sections, avoiding tangling or pulling damage to the wiring.

In this embodiment, as shown in FIGS. 14-15, each of the multiple hollow column sections 111 is internally provided with an enclosing plate 115 extending along the length of the column section. The enclosing plate 115 is connected to the inner wall of the hollow column section 111 to form a second mounting channel 116. A space between the outer wall of the enclosing plate 115 and the inner wall of the hollow column section 111 forms a plug-in hole 117 at one end of the hollow column section 111. The other end of the hollow column section 111 is provided with a plug-in post 118. The plug-in post 118 is inserted into the plug-in hole 117, enabling the detachable connection of two adjacent hollow column sections 111. The first light-emitting assembly 12 is installed in the second mounting channel 116. The second mounting channel, formed by the connection between the enclosing plate and the inner wall of the hollow column section, provides an independent and stable installation space for the first light-emitting assembly. The cooperation between the plug-in hole at one end and the plug-in post at the other end of the hollow column sections achieves quick and precise assembly of adjacent sections. This structure is simple and reliable. When users assemble or disassemble the hollow column sections, they only need to align and insert the plug-in post into the plug-in hole or remove the plug-in post from the plug-in hole, making the operation convenient and effortless, and further simplifying the assembly process. Furthermore, since the first light-emitting assembly is installed in the second mounting channel, adjacent hollow column sections are connected via the plug-in post and the plug-in hole, which is convenient for precise alignment of the electrical connectors of the first light-emitting assemblies. This allows the mechanical connection and electrical connection to be completed simultaneously, greatly improving assembly efficiency. It also ensures the stability and reliability of the connections, preventing circuit faults or unstable lighting caused by improper connections. Additionally, the plug-in structure formed between the periphery of the enclosing plate and the inner wall of the hollow column section is integrated during manufacturing, simplifying the overall structure and saving on production steps.

In this embodiment, as shown in FIGS. 14-15, the cross-section of the hollow column section 111 is triangular, while the cross-section of the enclosing plate 115 is U-shaped. The corner portions 1151 of the U-shaped enclosing plate are connected to the inner side walls of the hollow column section 111. This connection method not only increases the contact area between the enclosing plate 115 and the inner wall of the hollow column section 111, enhancing the connection's firmness and preventing the enclosing plate 115 from loosening or deforming under long-term use or external impact, but also strengthens the structural stability of the second mounting channel. This ensures a stable and reliable installation position for the first light-emitting assembly 12 within the second mounting channel. Furthermore, the triangular side walls of the hollow column section, combined with the U-shaped enclosing plate structure, result in a more compact and rational internal spatial layout of the column section. This configuration facilitates a tighter fit when the plug-in post is inserted into the plug-in hole. The inherent stability of the triangular structure allows for a tighter plug-in connection between adjacent hollow column sections, effectively reducing any wobble gap after assembly and enhancing the overall structural strength of the support column. This ensures that the column lamp 10 maintains a stable posture during use.

In this embodiment, as shown in FIGS. 14-15, the hollow column section 111 further includes a housing 1114 and a plug-in lampshade 1115. The housing 1114 is provided with an opening 1116 corresponding to the second mounting channel 116. The first light-emitting assembly 12 is arranged in the second mounting channel 116 facing the opening 1116, and the light emitted by the first light-emitting assembly 12 is directed towards the opening 1116. Grooves 1160 are provided on opposing side walls of the second mounting channel 116. The plug-in lampshade 1115 is provided with plug-in protrusions 1165 corresponding to the grooves 1160. The plug-in lampshade 1115 can be connected to the enclosing plate 115 by inserting the plug-in protrusions 1165 into the grooves 1160. A side wall of the plug-in lampshade 1115 together with the side wall of the housing 1114 to form the side wall of the hollow column section 111. The grooves 1160 include a first groove 1161 and a second groove 1162, while the plug-in protrusions 1165 include a first plug-in protrusion 1163 and a second plug-in protrusion 1164. The first groove 1161 is located on the opposing side walls of the second mounting channel 116 adjacent to the first light-emitting assembly 12, and the second groove 1162 is located on the opposing side walls of the second mounting channel 116 adjacent to the opening 1116. The first plug-in protrusion 1163 and the second plug-in protrusion 1164 are configured to be inserted into the first groove 1161 and the second groove 1162, respectively. This configuration achieves a convenient detachable connection between the plug-in lampshade 1115 and the housing 1114, while providing effective protection and light guidance for the first light-emitting assembly 12. Specifically, the first groove 1161 and the second groove 1162 are arranged on the opposing side walls adjacent to the first light-emitting assembly 12 and the opening 1116 within the second mounting channel 116, forming corresponding upper-lower or front-back sliding tracks. The first plug-in protrusion 1163 and the second plug-in protrusion 1164 on the plug-in lampshade 1115 match the first groove 1161 and the second groove 1162 respectively. To install the plug-in lampshade 1115, one simply aligns the first and second plug-in protrusions with the first and second grooves and slides the first and second plug-in protrusions along a length of the first and second grooves. It is simple and quick in operation without additional fasteners like screws, thus improving assembly efficiency. This plug-in structure ensures a tight and stable connection between the plug-in lampshade 1115 and the housing 1114, effectively preventing the lampshade from loosening or wobbling during use. Additionally, when maintenance, replacement of the first light-emitting assembly 12, or cleaning inside the plug-in lampshade 1115 is required, the plug-in lampshade 1115 can be easily detached, greatly facilitating maintenance.

In this embodiment, as shown in FIGS. 14-16, the housing 1114 and the enclosing plate 115 cover the first light-emitting assembly 12. The light from the first light-emitting assembly 12 is transmitted outward through the plug-in lampshade 1115. The housing 1114 and the enclosing plate 1115 can effectively shield the light emitted by the first light-emitting assembly 12, which can confine the light within the second mounting channel and preventing leakage from unintended directions, thereby ensuring that the light is concentrated and directed towards the plug-in lampshade 1115. The plug-in lampshade 1115 can be made of materials such as frosted, transparent, colored, or textured types to diffuse, refract, or filter the light, which can ensure a soft, uniform light and shadow effect for the final emitted light, thereby enhancing the column lamp's ability to create atmosphere. Additionally, the housing 1114, the enclosing plate 115, and the plug-in lampshade 1115 provide physical protection for the first light-emitting assembly 12, preventing direct contact with external dust, moisture, or foreign objects that could damage the LED beads and wiring, thereby extending their service life.

In the embodiments shown in FIGS. 15-17 and FIG. 20, the second electrical connector 1211 is an electrical plug, and the third electrical connector 1212 is an electrical socket. The electrical plug can be detachably inserted into the electrical socket. The first electrical connector 202 is either an electrical socket or an electrical plug. Alternatively, as shown in FIG. 18, the second electrical connector 1211 can be a pin, and the third electrical connector 1212 can be an electrical contact point. The pin is electrically connected to the contact point. In this case, the first electrical connector 202 is either a pin or an electrical contact point. When using such plug-and-socket connection method, detachably inserting the plug into the socket allows for quick connection and disconnection of the circuit between adjacent first light-emitting assemblies, as well as between the column lamp and the projection lamp. This structure is simple and reliable. When users assemble the hollow column sections, they only need to align and insert the plug into the socket to complete the circuit connection. For disassembly, simply pulling them apart. This operation is convenient and offers high connection stability. When the first electrical connector is a socket or a plug, it can flexibly adapt to the connection requirements between the column lamp and the projection lamp, enhancing the product's versatility and compatibility. If the second electrical connector is a pin and the third is a contact point, with the pin making electrical contact with the corresponding contact point, then during the assembly of adjacent hollow column sections, precise alignment and contact between the pins and the contact points can be achieved without additional plugging/pulling actions. The electrical connection is completed simultaneously with the mechanical assembly, further simplifying the installation steps. This contact-based connection structure is compact, occupies minimal space, and is suitable for scenarios requiring high installation precision, while ensuring stable and reliable circuit connections. Configuring the first electrical connector as the pin or the contact point allows flexible matching with the electrical connector type of the column lamp, ensuring convenient and efficient electrical connection between the column lamp and the projection lamp.

In this embodiment, as shown in FIGS. 15-16, the first light-emitting assembly 12 includes a fixed light board 123 and multiple fourth LED beads 124. The column lamp 10 further includes a power cord 119. The fourth LED beads 124 are mounted on the fixed light board 123, and the power cord 119 is electrically connected to the fixed light board 123. The fixed light board provides a stable mounting platform for the fourth LED beads. As the core light-emitting elements of the column lamp, parameters such as the number, color, and color temperature of the fourth LED beads can be flexibly configured according to the design requirements of the ambient lamp. This enables diverse lighting effects, such as solid colors, multi-color gradients, or breathing/flashing patterns, meeting the needs for creating different atmospheric scenarios.

The power cord 119 acts as a bridge for energy transmission, delivering external power to the fixed light board via the third circuit board. It provides stable working voltage and current to the fourth LED beads, ensuring that the fourth LED beads can illuminate normally and steadily. When the support column consists of multiple detachably connected hollow sections, the fixed light boards within each section can be connected in series through the second and third electrical connectors. The power cord is connected to the third circuit board located in the support base 13, which then delivers power to the fixed light boards and fourth LED beads within each hollow section. This ensures consistent illumination for the entire column lamp and the projection lamp. This structural design facilitates the assembly and maintenance of the first light-emitting assembly, allowing for targeted inspection or replacement of specific fixed light boards, thereby reducing maintenance costs.

Figure 2:
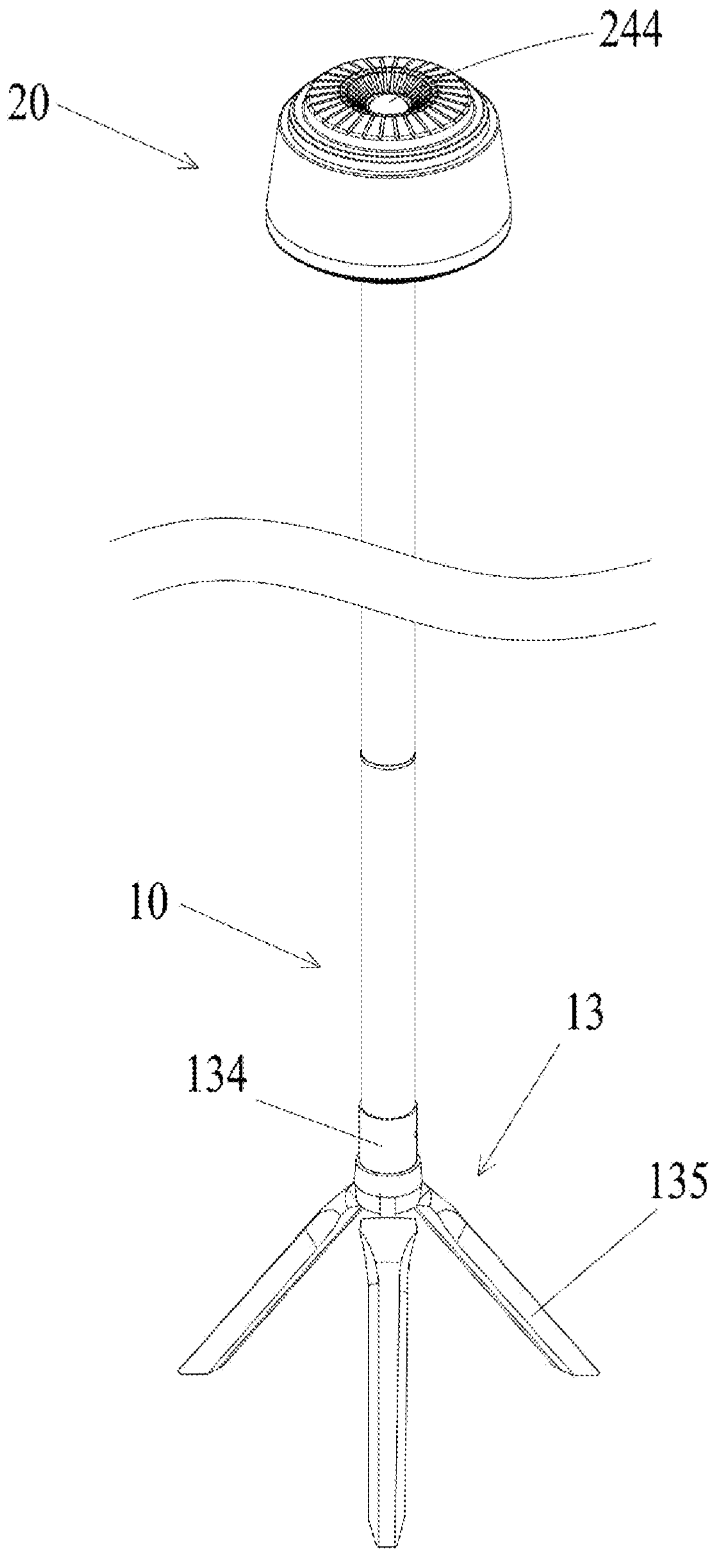
FIG. 2 is a schematic diagram of a variant embodiment of the ambient lamp of the first embodiment of the present disclosure.

In this embodiment, as shown in FIGS. 1-2, the column lamp 10 further includes a support base 13, and the support column 11 is detachably mounted on the support base 13. As shown in FIG. 1, in one embodiment, the support base 13 includes a first bracket 132 and a second bracket 133. One end of the first bracket 132 is connected to one end of the second bracket 133 to form a connection angle 1321 between them, which ranges between 90 and 180 degrees.

As shown in FIG. 2, in another embodiment, the support base 13 includes a mounting seat 134 and at least one movable bracket 135. The support column 11 is detachably mounted on the mounting seat 134, and the movable brackets 135 are movably connected to the bottom of the mounting seat 134. Specifically, as shown in FIG. 2, there are three movable brackets 135 arranged around the mounting seat 134 and rotatably connected to the mounting seat 134. When the support base 13 adopts the structure where the first and second brackets are connected, the connection angle between 90 and 180 degrees provides greater stability when the base is placed. When the connection angle is adjusted to 90 degrees, the first and second brackets are perpendicular to each other, forming an L-shaped support structure. This allows the base to better fit into corners (such as wall corners or desk edges), utilizing the right-angle space for stable support while enhancing the base's resistance to tipping. The second type of support base structure consists of a mounting seat and three movable brackets. The three movable brackets are arranged around the mounting seat and are all rotatably connected to the bottom of the mounting seat, forming a stable tripod-like support structure. Each movable bracket can be independently adjusted in terms of its spread angle and support position. Users can flexibly adjust the extension angle of each bracket based on flatness of the placement surface (such as a desktop, floor, or uneven countertop), ensuring the column lamp remains stable even on non-horizontal surfaces. This effectively prevents the risk of toppling and damage due to unstable placement. When stored, the three movable brackets can be folded inward and gathered under the mounting seat, significantly reducing the storage volume of the support base. Combined with the detachable design of the hollow column sections, this allows the entire column lamp to be compressed into a smaller space when not in use, facilitating portability and storage. Compared to traditional fixed bases, this multi-bracket support structure provides a larger support area and more even load distribution, significantly enhancing the overall stability of the column lamp during use. Even if the column lamp is tall or subjected to slight external impact, it is less prone to wobbling or tipping over.

The ambient lamp in this embodiment not only is simple in structure but also incorporates a modular assembly method that enhances production efficiency, reduces the overall cost of the ambient lamp, and ensures the independence and stability of the light and shadow effects from each light-emitting assembly. Through the combined design of the column lamp and the projection lamp, the ambient lamp achieves both stable support and diverse light and shadow effects. The column lamp not only provides a stable mounting base for the projection lamp but also allows the first light-emitting assembly to emit light outward through the second mounting channel of the support column and the plug-in lampshade, enriching the overall lighting layers. Meanwhile, the projection lamp, through the coordinated action of the third, fourth, and second light-emitting assemblies, achieves multi-directional and multi-form light and shadow output. Specifically, the third light-emitting assembly, arranged in a surrounding manner, provides uniform peripheral ambient lamp. The light from the fourth light-emitting assembly is directed toward and surrounds the column lamp, illuminating it and enhancing its visual effect. The second light-emitting assembly, driven by the drive module, rotates the light-transmitting sheet. The light from the projection lamp passes through the rotating light-transmitting sheet and lens to form ambient lamp effects on external objects, creating a natural, flowing light and shadow atmosphere. This design effectively addresses the issues of single lighting effects and lack of dynamic layers in existing ambient lamps, improving the user experience. Simultaneously, the support base of the column lamp, whether it is the structure formed by the first and second brackets with a specific connection angle or the structure combining the mounting seat with movable brackets, ensures stable placement of the ambient lamp, prevents tipping or shifting, and adapts to more usage scenarios. The detachable connections between components, such as the plug connection between hollow column sections via plug posts and holes, and the detachable installation between the support column and support base, further facilitate product assembly, transportation, and maintenance.

It can be understood that the projection lamp 20 is detachably connected to the column lamp 10. An end of the projection lamp 20 is provided with the first electrical connector 202, which is electrically connected to the second light-emitting assembly 23. An end of the column lamp 10 is provided with the second electrical connector 1211. The first electrical connector 202 and the second electrical connector 1211 are detachably electrically connected. The first electrical connector 202 has at least three first electrical terminals 20*a*, and the second electrical connector 1211 has at least three second electrical terminals 10*a*. The at least three first electrical terminals 20*a* are respectively used for electrical connection with the at least three corresponding second electrical terminals 10*a*. Thus, the at least three first electrical terminals 20*a* and the at least three second electrical terminals 10*a* are used to transmit power supply signals and lighting control signals.

Figure 17:
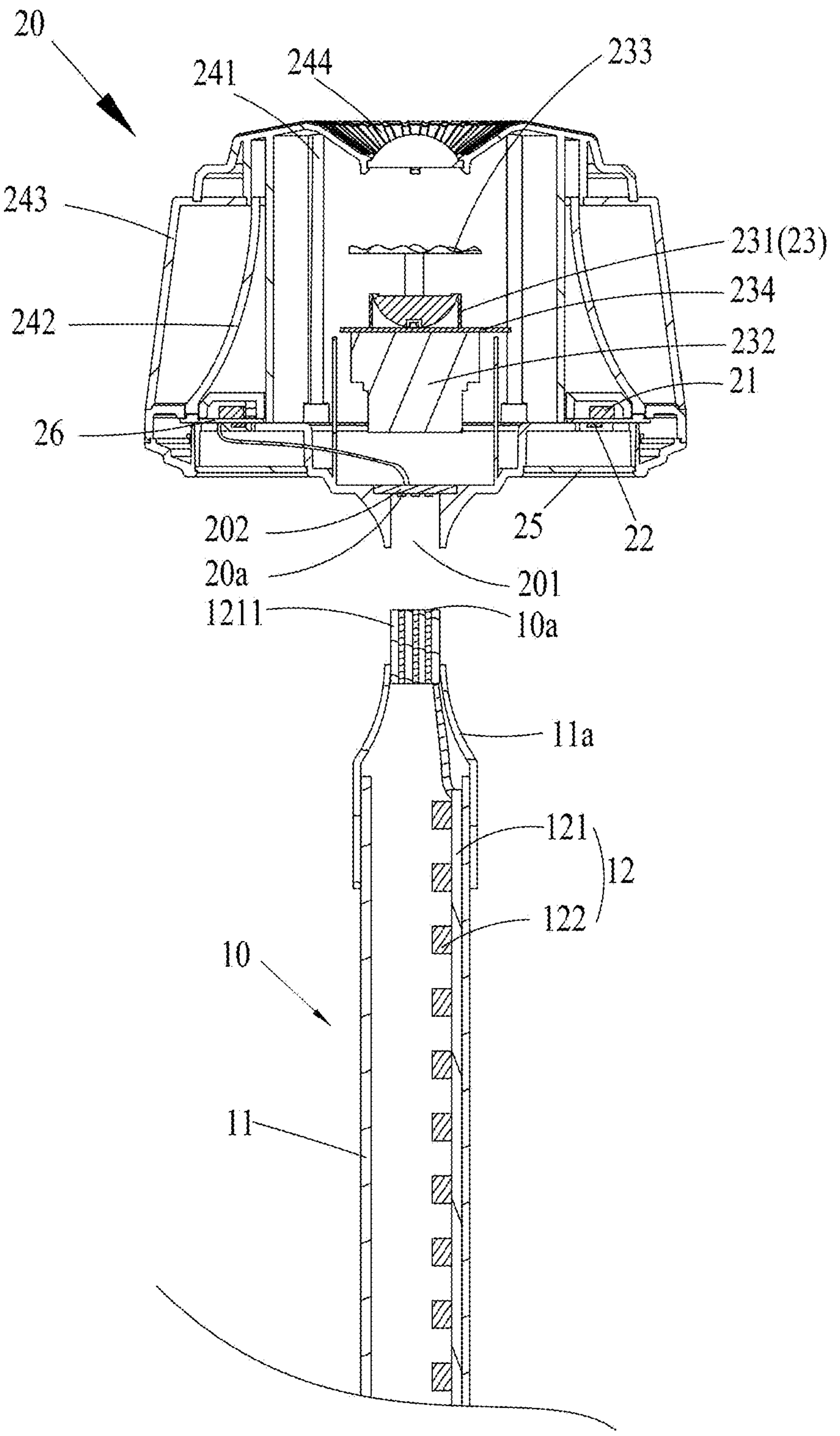
FIG. 17 is a cross-sectional view of the ambient lamp according to the second embodiment of the present disclosure, where the column lamp and the projection lamp are separated from each other.
Figure 18:
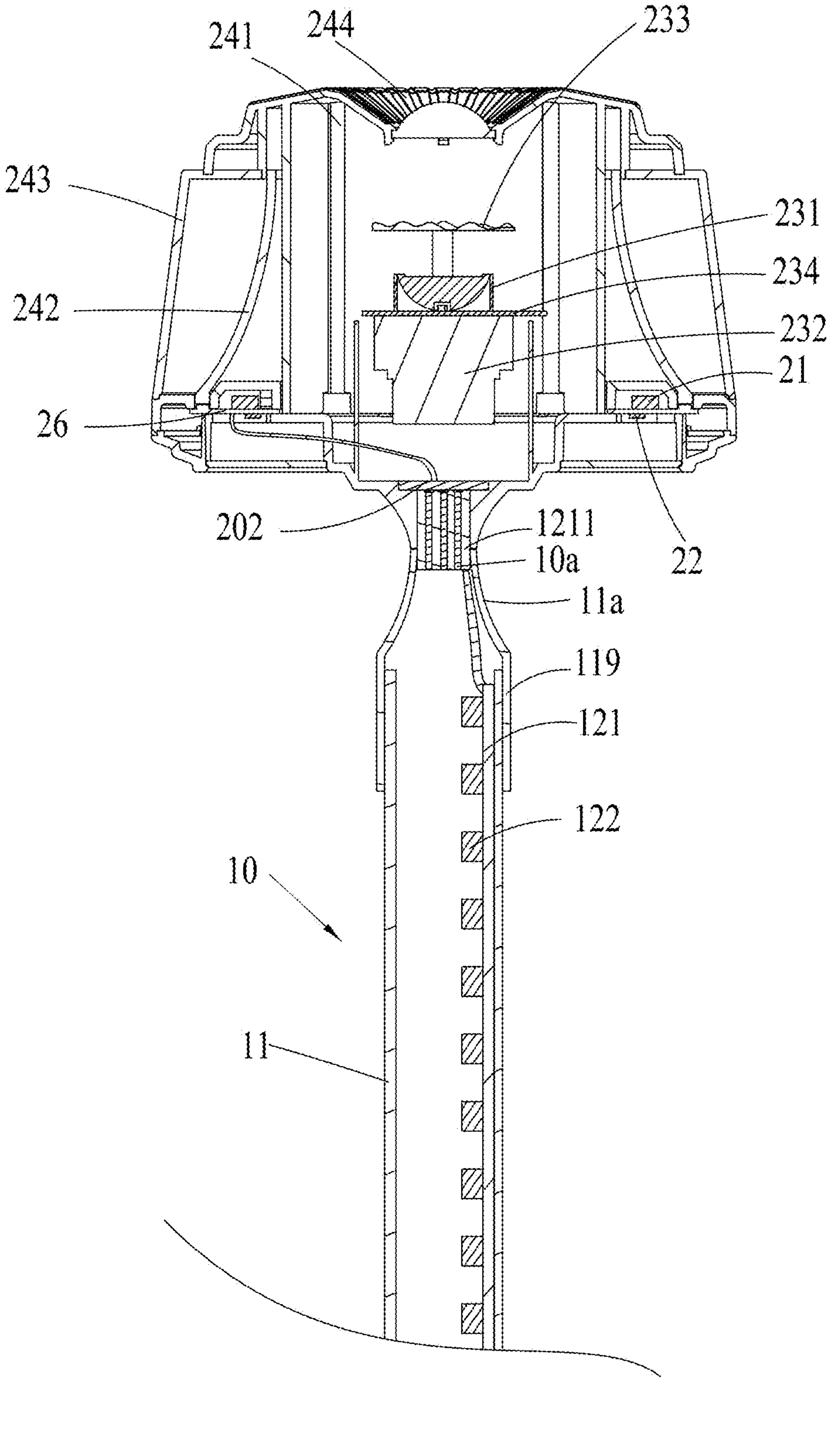
FIG. 18 is a cross-sectional view of the ambient lamp according to the second embodiment of the present disclosure, where the column lamp and the projection lamp are connected with each other.

Furthermore, as shown in FIGS. 17 and 18, in the first embodiment, the support column 11 further includes a connection housing 11*a*. The connection housing 11*a* is connected to the end of the hollow column section 111 adjacent to the projection lamp 20. The second electrical connector 1211 can be fixed on the connection housing 11*a*, and the first electrical connector 202 can be fixed on the projection lamp 20, specifically within the accommodating cavity formed by the bearing base 25 and the lampshade assembly 24. The second electrical connector 1211 is electrically connected to the light panel 121 via wires. The connection housing 11*a* is plugged into the bottom of the bearing base 25. Specifically, the top end of the connection housing 11*a* can be plugged into a plug hole 201 at the bottom of the bearing base 25, thus placing the projection lamp 20 and the column lamp 10 in a connected state. At this point, the second electrical connector 1211 and the first electrical connector 202 are in contact and electrically conductive, thereby transmitting power supply signals and lighting control signals. Specifically, in this embodiment, the column lamp 10 transmits power supply signals and lighting control signals to the projection lamp 20 to supply power to the projection lamp 20 and control illumination of the projection lamp 20.

Figure 21:
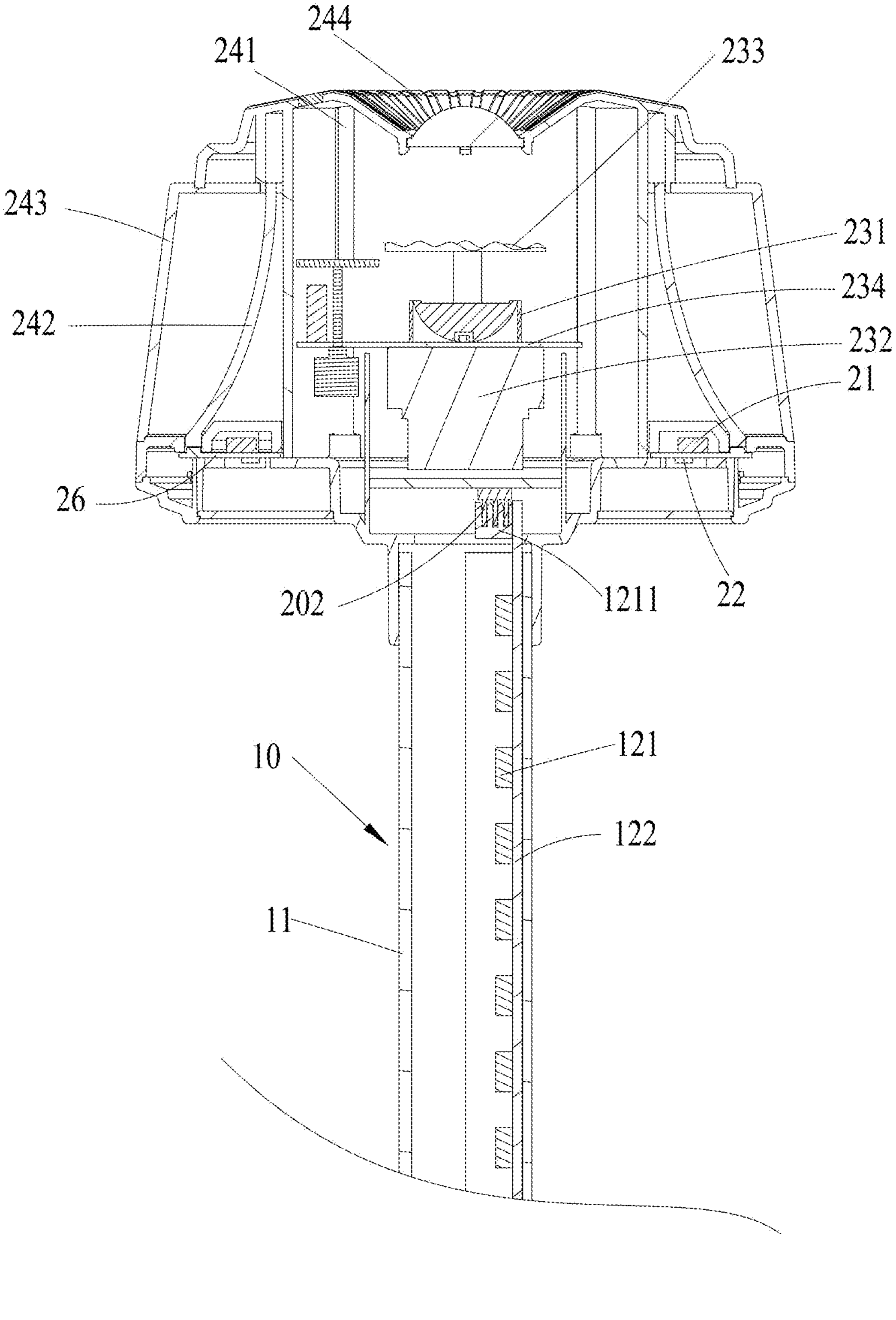
FIG. 21 is a cross-sectional view of the ambient lamp according to a fourth embodiment of the present disclosure, where the column lamp and the projection lamp are connected with each other.

Furthermore, as shown in FIG. 21, the main difference between the fourth embodiment and the first embodiment is as follows: the second electrical connector 1211 and the first electrical connector 202 are respectively electrical connectors. When assembling the projection lamp 20 and the column lamp 10, the second electrical connector 1211 is first plugged into the first electrical connector 202, and then the connection housing 11*a* is connected to the bearing base 25—for instance, by plugging the connection housing 11*a* into the bearing base 25—to bring the projection lamp 20 and the column lamp 10 into the connected state.

Figure 22:
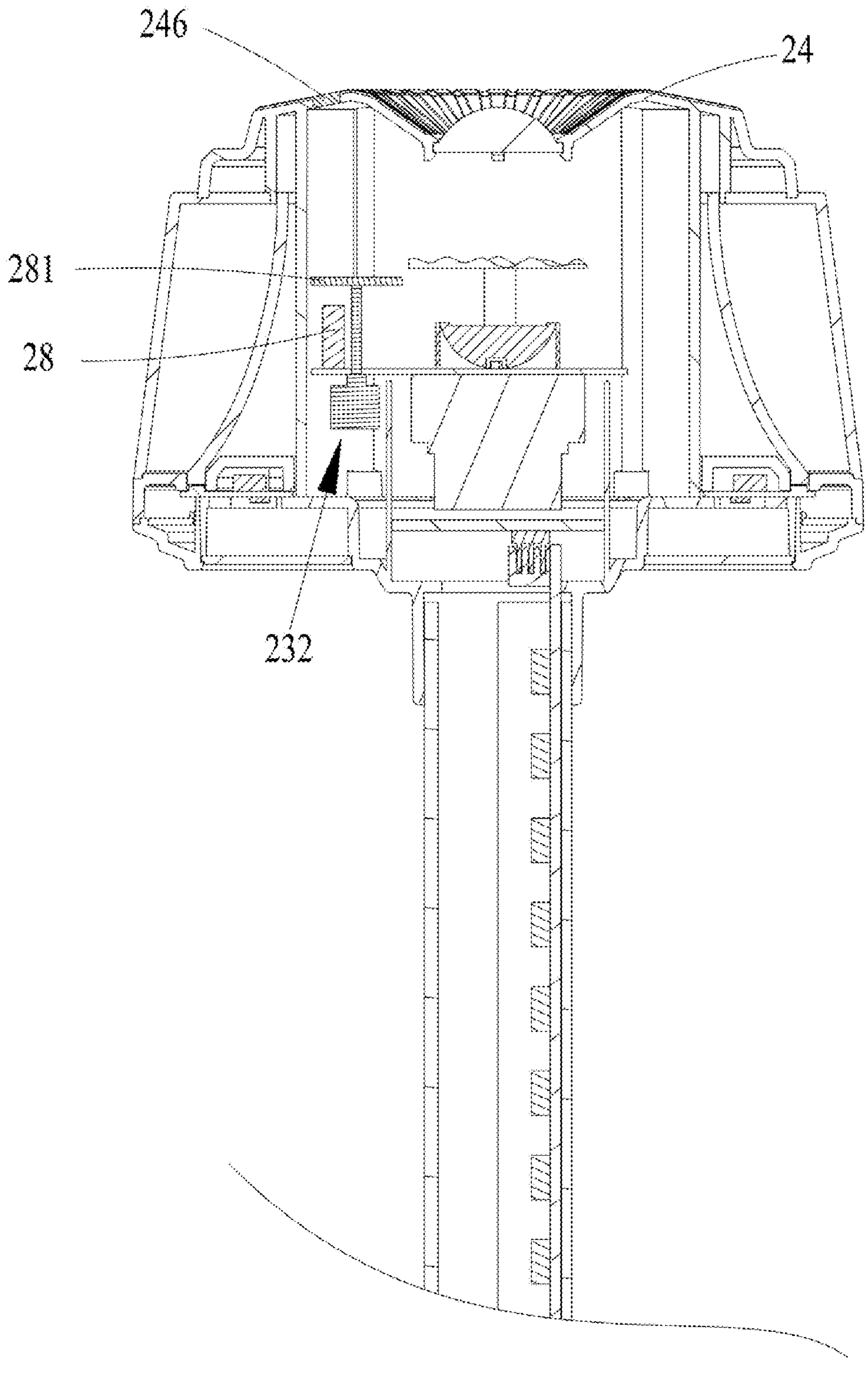
FIG. 22 is a cross-sectional view of the ambient lamp according to a fifth embodiment of the present disclosure, where the column lamp and the projection lamp are connected with each other.

As shown in FIG. 22, in the fifth embodiment, the projection lamp 20 further includes a projection light source 28 and one or more light-transmitting sheets 281 and/or 246 with preset patterns. The projection light source 28 is located within the accommodating cavity and is configured to emit light in a direction away from the column lamp 10. The light-transmitting sheets 281, 246 are arranged on the lampshade assembly 24. The light emitted by the projection light source 28 is projected onto an external object via the light-transmitting sheet(s) 281 and/or 246, thereby forming a projection pattern corresponding to the preset pattern on the external object.

Specifically, the projection light source 28 may include a laser module, and the projection pattern is a laser projection pattern. The light-transmitting sheets 281, 246 include at least one of a grating sheet, a film sheet, or a corrugated sheet. In some embodiments, to enable the projection light source 28 to achieve dynamic projection effects, the drive module 232 is further configured to drive at least a portion of the light-transmitting sheet 281 to move, such that the projection pattern becomes a dynamic projection pattern. It can be understood that the drive module 232 may include two motors, which can be respectively connected to the light-transmitting sheet 233 and the light-transmitting sheet 281 to drive the corresponding light-transmitting sheets 233, 281 to move.

Figure 23:
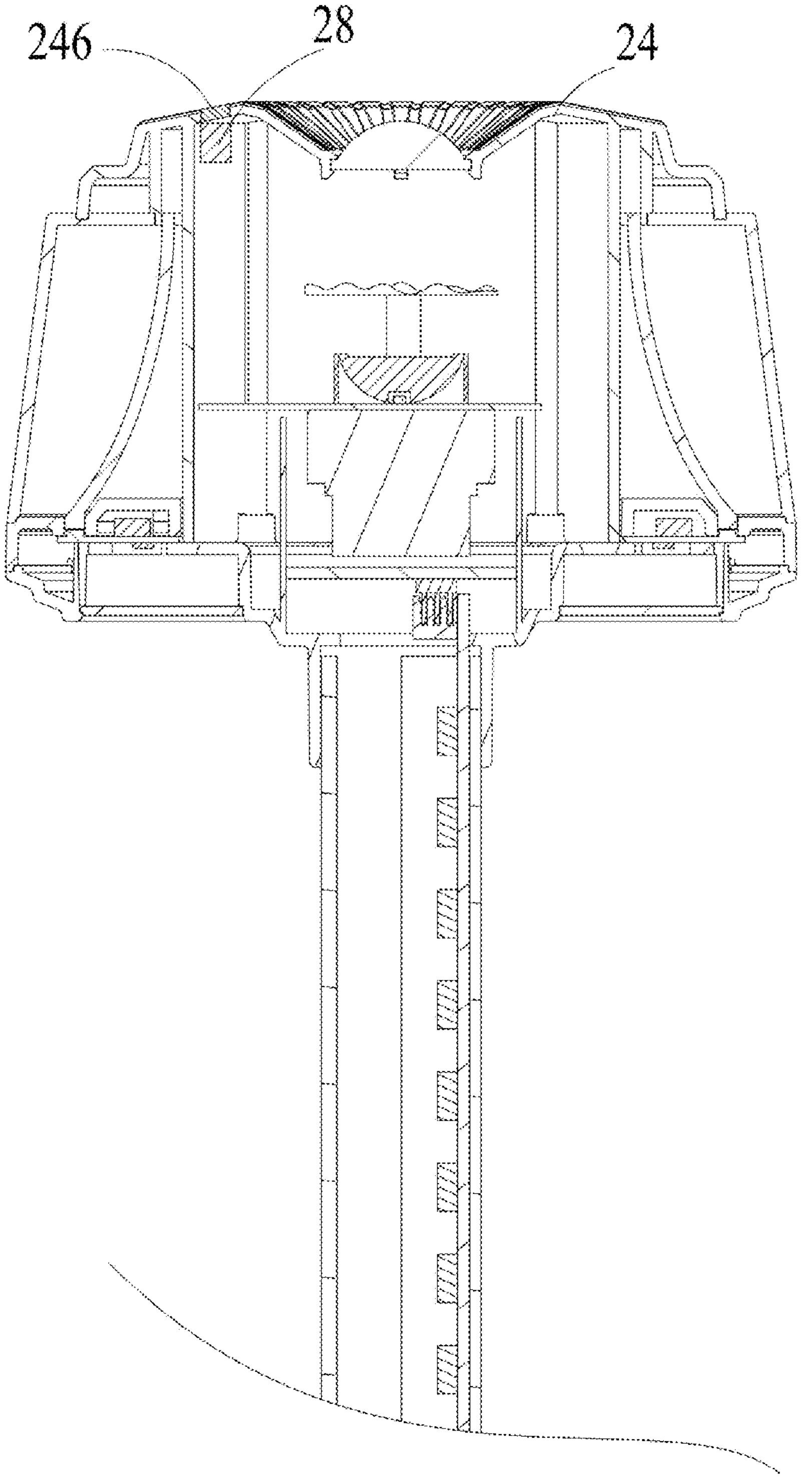
FIG. 23 is a cross-sectional view of the ambient lamp according to a sixth embodiment of the present disclosure, where the column lamp and the projection lamp are connected with each other.

In other embodiments, the projection light source 28 can be arranged inside the lampshade assembly 24, such as a top of the lampshade assembly as shown in FIG. 23. For example, the projection light source 28 can be arranged at a top of the light-shielding cover 241 or a top of the protective shell 243. The light-transmitting sheets 281 can be omitted and the light-transmitting sheet 246 with preset pattern can be arranged on the top of the lampshade assembly 24 corresponding to the projection light source 28 and is configured to allow light emitted by the projection light source 28 to pass therethrough.

It can be understood that, within the projection lamp 20, the second light-emitting assembly 23, the third light-emitting assembly 21, the fourth light-emitting assembly 22, and the projection light source 28 can each be independently controlled to emit light. In other words, the second light-emitting assembly 23, the third light-emitting assembly 21, the fourth light-emitting assembly 22, and the projection light source 28 can each be turned on, turned off, or have their lighting modes adjusted independently. The lighting control signals transmitted between the second electrical connector 1211 and the first electrical connector 202 are specifically used for such control. In this embodiment, the lighting control signals transmitted from the column lamp 10 to the projection lamp 20 are used to control the independent activation, deactivation, or adjustment of the lighting modes of the second light-emitting assembly 23, the third light-emitting assembly 21, the fourth light-emitting assembly 22, and the projection light source 28. The at least three first electrical terminals 20*a* and the at least three second electrical terminals 10*a* may include two power signal terminals for transmitting power supply signals and at least one (such as two or three) control data terminals for transmitting lighting control signals.

Although specific descriptions have been provided in conjunction with the accompanying drawings and embodiments in the present disclosure, it is understood that the above descriptions do not limit this application in any form. Those skilled in the art can make deformations and changes to the present disclosure according to needs without deviating from the essence and scope of this application, and these deformations and changes all fall within the scope of this application.

What is claimed is:

1. An ambient lamp, comprising:

a column lamp, comprising a support column and a first light-emitting assembly arranged on the support column and extending along a length direction of the support column; and a projection lamp, supported on the column lamp; wherein the projection lamp is electrically connected to the column lamp and is configured to project dynamic projection light;

wherein the projection lamp comprises a bearing base, a lampshade assembly, a second light-emitting assembly, a drive module, and a first light-transmitting sheet, the bearing base is configured to be supported on the column lamp, the lampshade assembly is connected to the bearing base to form an accommodating cavity, the second light-emitting assembly and the drive module are arranged in the accommodating cavity and are arranged on a side of the bearing base facing away from the column lamp; the first light-transmitting sheet is arranged on a light-emitting side of the second light-emitting assembly; light emitted by the second light-emitting assembly is directed away from the column lamp; the drive module is connected to the first light-transmitting sheet and is configured to drive the first light-transmitting sheet to move to have the light emitted by the second light-emitting assembly to pass through the first light-transmitting sheet to generate the dynamic projected light; and wherein the projection lamp further comprises a third light-emitting assembly and/or a fourth light-emitting assembly, the third light-emitting assembly and/or the fourth light-emitting assembly are arranged in the accommodating cavity and are electrically connected to the second light-emitting component; the third light-emitting assembly and/or the fourth light-emitting assembly are arranged around the second light-emitting assembly and the driving module respectively, and are configured to emit light towards a bottom side of the projection lamp and/or a periphery side of the projection lamp that is different from a top side and a bottom side.

2. The ambient lamp according to claim 1, wherein the projection lamp further comprises a first control circuit board; the third light-emitting assembly comprises multiple first light beads arranged in a surrounding manner on the first control circuit board and are arranged on a side of the first control circuit board facing away from the column lamp; the fourth light-emitting assembly comprises multiple second light beads arranged in a surrounding manner on the first control circuit board and are arranged on a side of the first control circuit board facing towards the column lamp; the first control circuit board is arranged on a side of the bearing base facing away from the column lamp.

3. The ambient lamp according to claim 2, wherein the second light-emitting assembly comprises a projection light and a second control circuit board electrically connected to the first control circuit board; the driving module includes at least one motor arranged on the supporting base; the second control circuit board is arranged on the driving module and is electrically connected to the driving module; the projection light is arranged on the second control circuit board; the first light-transmitting sheet has a preset pattern and comprises at least one of a grating sheet, a film sheet, or a rippled sheet; the first light-transmitting sheet is connected to an output end of the driving module and is arranged above the projection light; the driving module is configured to drive the first light-transmitting sheet to rotate so that the light from the projection light is capable of sequentially passing through the rotating first light-transmitting sheet and the lampshade assembly to form the dynamic projected light.

4. The ambient lamp according to claim 3, wherein the bearing base is provided with two supporting columns symmetrically arranged around an axis of the bearing base; a top of each supporting column is provided with a first mounting hole; the drive module comprises fixing lugs corresponding to the supporting columns; each fixing lug is provided with a second mounting hole corresponding to the first mounting hole; the second control circuit board defines a third mounting hole corresponding to the second mounting hole; the third mounting hole, the second mounting hole, and the first mounting hole are configured to allow a fixing member to pass therethrough in sequence to fix the second control circuit board and the drive module onto the supporting columns.

5. The ambient lamp according to claim 1, wherein the third light-emitting assembly is arranged on a periphery of the second light-emitting assembly; the lampshade assembly comprises a light-shielding cover, a light-transmitting cover, a protective shell, and a lens; the third light-emitting assembly is arranged inside the light-transmitting cover, and the light-transmitting cover is arranged inside the protective shell; the light-shielding cover is configured to isolate light emitted by the third light-emitting assembly from light emitted by the second light-emitting assembly; the lens is mounted on a top of the light-shielding cover and is configured to allow the light emitted by the second light-emitting assembly to pass therethrough; the light-transmitting cover is configured to cover the third light-emitting assembly, and the light emitted by the third light-emitting assembly is capable of passing through both the light-transmitting cover and the protective shell.

6. The ambient lamp according to claim 2, wherein the bearing base is provided with first light-transmitting holes corresponding to multiple second light beads; the lampshade assembly further comprises a light-transmitting plate arranged at a bottom of the bearing base; light emitted by the fourth light-emitting assembly is capable of passing through the first light-transmitting holes and the light-transmitting plate towards the column lamp.

7. The ambient lamp according to claim 6, wherein the bearing base comprises an inner sidewall, a central annular wall and a central bottom wall arranged at a center of the bearing base, a top wall connected between the inner sidewall and the central annular wall, and an annular rim surrounding outer sides of the central annular wall and the top wall; the central annular wall extends away from the column lamp from an outer periphery of the central bottom wall; the central annular wall is connected with the central bottom wall to form a first mounting groove; part of the second light-emitting assembly is arranged in the first mounting groove; a second mounting groove is formed between the inner sidewall and the annular rim; one end of the light-shielding cover is mounted in the second mounting groove and a sidewall of the end of the light-shielding cover is arranged adjacent to the annular rim; both the central annular wall and the inner sidewall extend towards the column lamp to form an annular third mounting groove; the first control circuit board is arranged on a side of the top wall facing away from the column lamp; the first light-transmitting hole is provided on the top wall and is configured to allow the light emitted by the fourth light-emitting assembly on the first control circuit board facing towards the column lamp to be projected through the first light-transmitting hole towards the column lamp; the light-transmitting plate is arranged in the second mounting groove.

8. An ambient lamp, comprising:

a column lamp, comprising a support column and a first light-emitting assembly arranged on the support column and extending along a length direction of the support column; and a projection lamp, supported on the column lamp; wherein the projection lamp is electrically connected to the column lamp and is configured to project dynamic projection light;

wherein the projection lamp comprises a bearing base, a lampshade assembly, a second light-emitting assembly, a drive module, and a first light-transmitting sheet, the bearing base is configured to be supported on the column lamp, the lampshade assembly is connected to the bearing base to form an accommodating cavity, the second light-emitting assembly and the drive module are arranged in the accommodating cavity and are arranged on a side of the bearing base facing away from the column lamp; the first light-transmitting sheet is arranged on a light-emitting side of the second light-emitting assembly; light emitted by the second light-emitting assembly is directed away from the column lamp; the drive module is connected to the first light-transmitting sheet and is configured to drive the first light-transmitting sheet to move to have the light emitted by the second light-emitting assembly to pass through the first light-transmitting sheet to generate the dynamic projected light; and wherein the projection lamp further comprises a projection light source and a second light-transmitting sheet with preset patterns; the projection light source is arranged in the accommodating cavity and is configured to emit light in a direction away from the column lamp; the light emitted by the projection light source is capable of being projected onto an external object via the second light-transmitting sheet, forming a projected pattern on the external object that corresponds to the preset pattern.

9. The ambient lamp according to claim 8, wherein the projection light source comprises a laser module, and the projection pattern is a laser projection pattern; the second light-transmitting sheet comprises at least one of a grating sheet, a film sheet, or a corrugated sheet; the driving module is further configured to drive movement of the second light-transmitting sheet to make the projection pattern to be a dynamic projection pattern.

10. An ambient lamp, comprising:

a column lamp, comprising a support column and a first light-emitting assembly arranged on the support column and extending along a length direction of the support column; and a projection lamp, supported on the column lamp; wherein the projection lamp is electrically connected to the column lamp and is configured to project dynamic projection light;

wherein the projection lamp comprises a bearing base, a lampshade assembly, a second light-emitting assembly, a drive module, and a first light-transmitting sheet, the bearing base is configured to be supported on the column lamp, the lampshade assembly is connected to the bearing base to form an accommodating cavity, the second light-emitting assembly and the drive module are arranged in the accommodating cavity and are arranged on a side of the bearing base facing away from the column lamp; the first light-transmitting sheet is arranged on a light-emitting side of the second light-emitting assembly; light emitted by the second light-emitting assembly is directed away from the column lamp; the drive module is connected to the first light-transmitting sheet and is configured to drive the first light-transmitting sheet to move to have the light emitted by the second light-emitting assembly to pass through the first light-transmitting sheet to generate the dynamic projected light;

wherein the projection lamp is detachably connected to the column lamp; an end of the projection lamp is provided with a first electrical connector electrically connected to the second light-emitting assembly; the column lamp is provided with a second electrical connector; the first electrical connector is detachably and electrically connected to the second electrical connector; the first electrical connector has at least three first electrical terminals, while the second electrical connector has at least three second electrical terminals; the at least three first electrical terminals are configured to correspondingly connect with the at least three second electrical terminals to enable transmission of power supply signals and lighting control signals between the first electrical connector and the second electrical connector; and wherein the support column comprises a plurality of hollow column sections detachably connected in series; each of these hollow column sections defines a first mounting channel; the first light-emitting assembly comprises a light panel and multiple third light beads; an end of the light panel adjacent to the projection lamp is electrically connected to the second electrical connector; the multiple third light beads are arranged on the light panel; when the plurality of hollow column sections are connected in series, the first mounting channel on each of the hollow column sections are aligned and joined together to allow the light panel to be installed inside the plurality of hollow column sections through the first installation channel.

11. The ambient lamp according to claim 10, wherein two limiting plates are connected to an inner wall of each hollow column section and extends along a length direction of each hollow column section; the two limiting plates are arranged opposite to each other and a gap is defined between the two limiting plates, and the two limiting plates together with the inner wall of each hollow column section form the first mounting channel.

12. The ambient lamp according to claim 11, wherein the support column further comprises a connection joint; an end of the connection joint is configured to be inserted into one of two adjacent hollow column sections, and another end of the connection joint is configured to be inserted into another of the two adjacent hollow column sections; an outer surface of the connection joint is provided with a snap-fit groove configured to be engaged on both sides of the two limiting plates.

13. The ambient lamp according to claim 12, wherein an outer side of the connection joint is provided with a limiting ring configured to restrict an insertion position of the connection joint in the two adjacent hollow column sections.

14. The ambient lamp according to claim 10, wherein the multiple third light beads are arranged on a same side of the light panel; a side of each hollow column section facing the third light beads is a light-transmitting surface, and a side of each hollow column section facing away from the third light beads is an opaque surface;

the column lamp further comprises a support base, a power interface, a power switch, and a third circuit board; a top of the support base is provided with a fourth mounting groove; the third circuit board is arranged in the fourth mounting groove, and the support column is inserted into the fourth mounting groove; the light panel, the power interface, and the power switch are all electrically connected to the third circuit board, and at least part of the light panel is accommodated within the fourth mounting groove.

15. An ambient lamp, comprising:

a column lamp, comprising a support column and a first light-emitting assembly arranged on the support column and extending along a length direction of the support column; and a projection lamp, supported on the column lamp; wherein the projection lamp is electrically connected to the column lamp and is configured to project dynamic projection light;

wherein the projection lamp comprises a bearing base, a lampshade assembly, a second light-emitting assembly, a drive module, and a first light-transmitting sheet, the bearing base is configured to be supported on the column lamp, the lampshade assembly is connected to the bearing base to form an accommodating cavity, the second light-emitting assembly and the drive module are arranged in the accommodating cavity and are arranged on a side of the bearing base facing away from the column lamp; the first light-transmitting sheet is arranged on a light-emitting side of the second light-emitting assembly; light emitted by the second light-emitting assembly is directed away from the column lamp; the drive module is connected to the first light-transmitting sheet and is configured to drive the first light-transmitting sheet to move to have the light emitted by the second light-emitting assembly to pass through the first light-transmitting sheet to generate the dynamic projected light; and wherein the support column comprises a plurality of hollow column sections that are detachably connected to one another; the first light-emitting assembly is arranged in the plurality of hollow column sections; an end of the first light-emitting assembly is equipped with a second electrical connector, another end of the first light-emitting assembly is equipped with a third electrical connector; when two adjacent hollow column sections of the plurality of hollow column sections are connected, the second electrical connector of the first light-emitting assembly inside one of the two adjacent hollow column sections is capable of being electrically plugged into the third electrical connector of the first light-emitting assembly inside another of the two adjacent hollow column sections; either the second electrical connector or the third electrical connector is configured to be plugged into the first electrical connector provided on the projection lamp.

16. The ambient lamp according to claim 15, wherein in each of the plurality of hollow column sections, an enclosing plate is arranged along a length direction of each hollow column section; the enclosing plate is connected with an inner wall of each hollow column section to form a second mounting channel; an plug-in hole is formed between an outer wall of the enclosing plate and the inner wall of each hollow column section; the plug-in hole is arranged at one end of each hollow column section, while a plug-in post is provided at another end of each hollow column section; the plug-in post is capable of being inserted into the plug-in hole to enable detachable connection between the two adjacent hollow column sections; and the first light-emitting assembly is arranged inside the second mounting channel.

17. The ambient lamp according to claim 16, wherein each hollow column section further comprises a housing and a plug-in lampshade; the housing defines an opening corresponding to the second mounting channel; the first light-emitting assembly is arranged inside the second mounting channel facing the opening to allow light emitted by the first light-emitting assembly to be directed towards the opening; sliding grooves are arranged on two opposite sidewalls of the second mounting channel; the plug-in lampshade is provided with plug-in protrusions corresponding to the sliding grooves; the plug-in lampshade is capable of being connected to the enclosing plate by inserting the plug-in protrusions into the sliding grooves; a sidewall of the plug-in lampshade and a sidewall of the housing join together to form a sidewall of each hollow column section; the housing and the enclosing plate are configured to shield the light emitted by the first light-emitting assembly, and the plug-in lampshade is configured to allow the light emitted by the first light-emitting assembly to pass therethrough.

* * * * *